(12) United States Patent
Murphy et al.

(10) Patent No.: US 9,350,661 B2
(45) Date of Patent: *May 24, 2016

(54) AGGREGATION NETWORK WITH CENTRALIZED CONTROL

(71) Applicant: Juniper Networks, Inc., Sunnyvale, CA (US)

(72) Inventors: James M. Murphy, Alameda, CA (US); Abhijit K. Choudhury, Cupertino, CA (US); Pradeep Sindhu, Los Altos Hills, CA (US); Ina Minei, Mountain View, CA (US); Jayabharat Boddu, Los Altos, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/231,350

(22) Filed: Mar. 31, 2014

(65) Prior Publication Data

US 2014/0211615 A1 Jul. 31, 2014

Related U.S. Application Data

(63) Continuation of application No. 13/842,453, filed on Mar. 15, 2013, now Pat. No. 8,693,374.

(60) Provisional application No. 61/738,955, filed on Dec. 18, 2012.

(51) Int. Cl.
*H04L 12/801* (2013.01)
*H04L 12/28* (2006.01)
(Continued)

(52) U.S. Cl.
CPC ............... *H04L 47/12* (2013.01); *H04L 12/28* (2013.01); *H04L 41/12* (2013.01); *H04L 45/42* (2013.01); *H04L 41/0654* (2013.01); *H04L 45/50* (2013.01)

(58) Field of Classification Search
None
See application file for complete search history.

(56) References Cited

U.S. PATENT DOCUMENTS 7,263,061 B2 8/2007 Yamada
7,286,529 B1 10/2007 Thomas
(Continued)

FOREIGN PATENT DOCUMENTS

CN 1488215 A 4/2004
EP 1653688 A1 10/2005
(Continued)

OTHER PUBLICATIONS

Response to Extended European Search Report dated Feb. 26, 2014, from Counterpart European Patent Application No. 13197643.3, filed Oct. 7, 2014, 8 pp.
(Continued)

*Primary Examiner* — Ian N Moore
*Assistant Examiner* — Brian T Le
(74) *Attorney, Agent, or Firm* — Shumaker & Sieffert, P.A.

(57) ABSTRACT

An access network is described in which a centralized controller provides seamless end-to-end service from a core-facing edge of a service provider network through aggregation and access infrastructure out to access nodes located proximate the subscriber devices. The controller operates to provide a central configuration point for configuring aggregation nodes (AGs) of a network of the service provider so as to provide transport services to transport traffic between access nodes (AXs) and edge routers on opposite borders of the network.

22 Claims, 13 Drawing Sheets

(51) Int. Cl.
*H04L 12/24* (2006.01)
*H04L 12/717* (2013.01)
*H04L 12/723* (2013.01)

(56) References Cited

U.S. PATENT DOCUMENTS

| | | | |
|---|---|---|---|
| 8,018,880 | B2 | 9/2011 | Figueira et al. |
| 8,085,791 | B1 | 12/2011 | Aggarwal et al. |
| 8,259,718 | B2 | 9/2012 | Akahane et al. |
| 8,504,718 | B2 | 8/2013 | Wang et al. |
| 8,635,326 | B1 | 1/2014 | Chaganti et al. |
| 8,696,374 | B2 | 4/2014 | Oe et al. |
| 8,700,801 | B2 | 4/2014 | Medved et al. |
| 2002/0071390 | A1 | 6/2002 | Reeves et al. |
| 2003/0026268 | A1 | 2/2003 | Navas |
| 2004/0120710 | A1 | 6/2004 | Seddigh et al. |
| 2005/0117576 | A1* | 6/2005 | McDysan et al. ............. 370/389 |
| 2005/0152286 | A1* | 7/2005 | Betts et al. .................... 370/255 |
| 2007/0286198 | A1 | 12/2007 | Muirhead et al. |
| 2008/0159311 | A1 | 7/2008 | Martinotti et al. |
| 2008/0225864 | A1 | 9/2008 | Aissaoui et al. |
| 2008/0228943 | A1 | 9/2008 | Balus et al. |
| 2008/0239970 | A1 | 10/2008 | Lu et al. |
| 2008/0247406 | A1 | 10/2008 | Figueira et al. |
| 2011/0235524 | A1 | 9/2011 | North et al. |
| 2011/0235545 | A1 | 9/2011 | Subramanian et al. |
| 2012/0320926 | A1 | 12/2012 | Kamath et al. |
| 2013/0083782 | A1 | 4/2013 | Murphy et al. |
| 2013/0103818 | A1* | 4/2013 | Koponen et al. ............. 709/223 |
| 2013/0121164 | A1 | 5/2013 | Shabtay et al. |

FOREIGN PATENT DOCUMENTS

| | | | |
|---|---|---|---|
| EP | 1653675 | A1 | 5/2006 |
| EP | 1653690 | A1 | 5/2006 |
| WO | 2008118467 | A1 | 10/2008 |

OTHER PUBLICATIONS

Atlas et al., "Interface to the Routing System Framework," Network Working Group, Internet-Draft, Jul. 30, 2012, 21 pp.
Choudhury et al., "Cloud Control Protocol,"draft-ccp-02, Network Working Group, Internet-Draft, Nov. 16, 2012, 21 pp.
Fedyk et al., "GMPLS Control of Ethernet IVL Switches," Nortel, Oct. 2005, 16 pp.
Furquan et al., "ForCES Element Bindings and Topology Discovery Protocol: draft-anasari-forces-discovery-00.txt" Lucent Tech. Hormuzd Khosravi Intel Corp., Jul. 10, 2004, 14 pp.
Gredler et al., "Advertising Link-State Information in BGP," draft-gredler-bgp-te-01, Inter-Domain Routing, Internet-Draft, Jul. 11, 2011, 24 pp.
"Open Flow 1.2," Open Flow Switch Specification, Version 1.2 (Wire Protocol 0x03), Open Network Foundation, Dec. 5, 2011, 83 pp.
Vasseur et al., Path Computation Element (PCE) Communication Protocol (PCEP), Network Working Group, RFC 5440, Mar. 2009, 88 pp.
U.S. Appl. No. 13/324,861, by Jan Medved, filed Dec. 13, 2011.
U.S. Appl. No. 13/842,796, by James Michael Murphy, filed Mar. 15, 2013.
European Search Report from European Counterpart Application No. 13197643.3, dated Feb. 26, 2014, 8 pp.
Prosecution History from U.S. Pat. No. 8,693,374, dated Jul. 1, 2013 through Mar. 15, 2014, 57 pp.
Prosecution History from U.S. Pat. No. 8,711,855, dated Sep. 9, 2013 through Feb. 20, 2014, 51 pp.
Office Action from counterpart Chinese Application No. 201310701452.8, dated Feb. 3, 2015, 13 pp.
Examination Report from counterpart European Application No. 13197643.3, dated Nov. 17, 2015, 4 pp.
Notice of Allowance from U.S. Appl. No. 14/672,058, mailed Jun. 8, 2015, 14 pp.
Response to Examination Report dated Nov. 17, 2015, from counterpart European Application No. 13197643.3, filed Mar. 15, 2016, 12 pp.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                            Instance                           |
+-+-+-+-+-+-+-+-+-+-+-+-+-+-+-+-+-+-+-+-+-+-+-+-+-+-+-+-+-+-+-+-+
|                       Generation Number                       |
+-+-+-+-+-+-+-+-+-+-+-+-+-+-+-+-+-+-+-+-+-+-+-+-+-+-+-+-+-+-+-+-+
|           INL Start           |            INL End            |
+-+-+-+-+-+-+-+-+-+-+-+-+-+-+-+-+-+-+-+-+-+-+-+-+-+-+-+-+-+-+-+-+
|                       Neighbor Node List...                   |
+-+-+-+-+-+-+-+-+-+-+-+-+-+-+-+-+-+-+-+-+-+-+-+-+-+-+-+-+-+-+-+-+
|                              ...                              |
.                                                               .
.                                                               .
+-+-+-+-+-+-+-+-+-+-+-+-+-+-+-+-+-+-+-+-+-+-+-+-+-+-+-+-+-+-+-+-+
|                       ...Neighbor Node List                   |
+-+-+-+-+-+-+-+-+-+-+-+-+-+-+-+-+-+-+-+-+-+-+-+-+-+-+-+-+-+-+-+-+
|                       Intermediate Node List...               |
+-+-+-+-+-+-+-+-+-+-+-+-+-+-+-+-+-+-+-+-+-+-+-+-+-+-+-+-+-+-+-+-+
|                              ...                              |
.                                                               .
.                                                               .
+-+-+-+-+-+-+-+-+-+-+-+-+-+-+-+-+-+-+-+-+-+-+-+-+-+-+-+-+-+-+-+-+
|                       ...Intermediate Node List               |
+-+-+-+-+-+-+-+-+-+-+-+-+-+-+-+-+-+-+-+-+-+-+-+-+-+-+-+-+-+-+-+-+
```

FIG. 9

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                       Neighbor MAC Address...                 |
+-+-+-+-+-+-+-+-+-+-+-+-+-+-+-+-+-+-+-+-+-+-+-+-+-+-+-+-+-+-+-+-+
|   ...Neighbor MAC Address     |   Local Link  |  Remote Link  |
+-+-+-+-+-+-+-+-+-+-+-+-+-+-+-+-+-+-+-+-+-+-+-+-+-+-+-+-+-+-+-+-+
```

FIG. 10

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                   Intermediate Node MAC Address...             |
+-+-+-+-+-+-+-+-+-+-+-+-+-+-+-+-+-+-+-+-+-+-+-+-+-+-+-+-+-+-+-+-+
|   ...Intermediate Node MAC Addr |   Ingress Link  |  Egress Link  |
+-+-+-+-+-+-+-+-+-+-+-+-+-+-+-+-+-+-+-+-+-+-+-+-+-+-+-+-+-+-+-+-+
```

FIG. 11

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                        Generation Number                       |
+-+-+-+-+-+-+-+-+-+-+-+-+-+-+-+-+-+-+-+-+-+-+-+-+-+-+-+-+-+-+-+-+
```

FIG. 12

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   SRT Down Reason Code        |           Reserved             |
+-+-+-+-+-+-+-+-+-+-+-+-+-+-+-+-+-+-+-+-+-+-+-+-+-+-+-+-+-+-+-+-+
|      First 256 bytes of original message including             |
|         Ethernet Header                                        |
|         Source Route List                                      |
|         Message Header                                         |
|         Message Payload                                        |
.                                                                .
+----------------------------------------------------------------+
```

FIG. 13

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|                                                               |
|                        Value (variable)                       |
|                                                               |
+-+-+-+-+-+-+-+-+-+-+-+-+-+-+-+-+-+-+-+-+-+-+-+-+-+-+-+-+-+-+-+-+
```

FIG. 14

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                   Reserved                   | Total Entries |
+-+-+-+-+-+-+-+-+-+-+-+-+-+-+-+-+-+-+-+-+-+-+-+-+-+-+-+-+-+-+-+-+
|                      MPLS FIB Entry ...                       |
+-+-+-+-+-+-+-+-+-+-+-+-+-+-+-+-+-+-+-+-+-+-+-+-+-+-+-+-+-+-+-+-+
|                             ...                               |
.                                                               .
.                                                               .
+-+-+-+-+-+-+-+-+-+-+-+-+-+-+-+-+-+-+-+-+-+-+-+-+-+-+-+-+-+-+-+-+
|                     ... MPLS FIB Entry                        |
+-+-+-+-+-+-+-+-+-+-+-+-+-+-+-+-+-+-+-+-+-+-+-+-+-+-+-+-+-+-+-+-+
```

FIG. 15

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| R |Length |OP |M|Value|      Incoming Label                   |
+-+-+-+-+-+-+-+-+-+-+-+-+-+-+-+-+-+-+-+-+-+-+-+-+-+-+-+-+-+-+-+-+
|                         PATH ID                               |
+-+-+-+-+-+-+-+-+-+-+-+-+-+-+-+-+-+-+-+-+-+-+-+-+-+-+-+-+-+-+-+-+
| Primary Port  | R |PA |    Primary Egress Label               |
+-+-+-+-+-+-+-+-+-+-+-+-+-+-+-+-+-+-+-+-+-+-+-+-+-+-+-+-+-+-+-+-+
| Detour Port   | R |DA1|    Detour Egress Label 1              |
+-+-+-+-+-+-+-+-+-+-+-+-+-+-+-+-+-+-+-+-+-+-+-+-+-+-+-+-+-+-+-+-+
|       R               |DA2|    Detour Egress Label 2          |
+-+-+-+-+-+-+-+-+-+-+-+-+-+-+-+-+-+-+-+-+-+-+-+-+-+-+-+-+-+-+-+-+
```

FIG. 16

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                                         |   Total Entries    |
+-+-+-+-+-+-+-+-+-+-+-+-+-+-+-+-+-+-+-+-+-+-+-+-+-+-+-+-+-+-+-+-+
|         MPLS FIB Parse Status Entry  ...                      |
+-+-+-+-+-+-+-+-+-+-+-+-+-+-+-+-+-+-+-+-+-+-+-+-+-+-+-+-+-+-+-+-+
|                          ...                                  |
+-+-+-+-+-+-+-+-+-+-+-+-+-+-+-+-+-+-+-+-+-+-+-+-+-+-+-+-+-+-+-+-+
|              ... MPLS FIB Parse Status Entry                  |
+-+-+-+-+-+-+-+-+-+-+-+-+-+-+-+-+-+-+-+-+-+-+-+-+-+-+-+-+-+-+-+-+
```

FIG. 17

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                  Reserved                 |      Status       |
+-+-+-+-+-+-+-+-+-+-+-+-+-+-+-+-+-+-+-+-+-+-+-+-+-+-+-+-+-+-+-+-+
|                         PATH ID                               |
+-+-+-+-+-+-+-+-+-+-+-+-+-+-+-+-+-+-+-+-+-+-+-+-+-+-+-+-+-+-+-+-+
```

FIG. 18

AGGREGATION NETWORK WITH CENTRALIZED CONTROL

This application is a continuation of U.S. application Ser. No. 13/842,453, filed Mar. 15, 2013 which claims the benefit of U.S. Provisional Application No. 61/738,955, filed Dec. 18, 2012, the entire contents of both are incorporated herein by reference.

TECHNICAL FIELD

The invention relates to computer networks.

BACKGROUND

A wide variety of devices connect to service provider networks to access resources and services provided by packet-based data networks, such as the Internet, enterprise intranets, content providers and virtual private networks (VPNs). For example, many fixed computers utilize fixed communication links, such as optical, digital subscriber line, or cable-based connections, of service provider networks to access the packet-based services. In addition, a vast amount of mobile devices, such as cellular or mobile smart phones and feature phones, tablet computers, and laptop computers, utilize mobile connections, such as cellular radio access networks of the service provider networks, to access the packet-based services.

Each service provider network typically provides an extensive access network infrastructure to provide packet-based data services to the offered services. The access network typically includes a vast collection of access nodes, aggregation nodes and high-speed edge routers interconnected by communication links. These access devices typically execute various protocols and exchange signaling messages to anchor and manage subscriber sessions and communication flows associated with the subscribers. For example, the access devices typically provide complex and varied mechanisms for authenticating subscribers, identifying subscriber traffic, applying subscriber policies to manage subscriber traffic on a per-subscriber basis, applying various services to the traffic and generally forwarding the traffic within the service provider network.

As such, access networks represent a fundamental challenge for service providers and often require the service providers to make difficult tradeoffs over a wide range of user densities. For example, in some environments, user densities may exceed several hundred thousand users per square kilometer. In other environments, user densities may be as sparse as 1 or 2 users per square kilometer. Due to this diversity of requirements, access networks typically make use of a host of communication equipment and technologies.

SUMMARY

In general, an access/aggregation network is described in which a centralized controller provides seamless end-to-end service from a core-facing edge of a service provider network through aggregation and access infrastructure out to access nodes located proximate the subscriber devices. The controller operates to provide a central configuration point for configuring access nodes (AXs) and aggregation nodes (AGs) of an access/aggregation network of the service provider so as to provide transport services to transport traffic between access nodes and edge routers on opposite borders of the aggregation network. For simplicity, the access/aggregation network will be referred to herein as an "aggregation network," used to refer to a network that provides both access and aggregation.

The AGs may, for example, operate as label switched routers (LSRs) configured by the centralized controller to forward traffic along transport label switched paths (LSPs) defined within the aggregation network. The access nodes and the edge routers at the borders of the aggregation network operate as endpoints for the LSPs to map subscriber traffic into and out of the LSPs. In this way, the controller provides centralized, cloud-based control plane to configure the AGs to effectively operate as MPLS switching fabric to provide transport LSPs between the edge routers and the access nodes for transport of subscriber traffic.

Each AX and AG may provide minimal control plane function and essentially operate as low-cost, slave devices to the centralized controller. As such, the AXs and AGs may be lower cost and have less management complexity than conventional high-end routers typically used within an aggregation network since such devices often provide complex control-plane functions.

Further, a Cloud Control Protocol (CCP) is described in which the access and aggregation nodes automatically discover neighboring aggregation nodes and automatically connect to the centralized controller. As described, CCP simplifies topology discovery and path provisioning process within the aggregation network and provides a simple, highly available, scalable protocol for use within the aggregation network even though the AXs and AGs provide little to no control plane functionality.

In one example, a network includes a plurality of access devices to receive network packets from a plurality of subscriber devices, one or more routers that couple the network to a core network, and a plurality of aggregation nodes to receive the network packets and transport the network packets to the one or more routers, and a centralized controller in communication with the plurality of aggregation nodes, the routers, and the access devices. Each of the aggregation nodes operates a reduced control plane without execution of a layer three (L3) routing protocol to maintain routing information for the aggregation networks and generate forwarding information for the aggregation node, and the centralized controller outputs one or more messages to the aggregation nodes to communicate and install within each of the aggregation nodes forwarding information for one or more transport label switched paths (LSPs) for transporting the network packets between the access nodes and the routers via the aggregation nodes.

In another example, a method is described for configuring a network having a plurality of aggregation nodes to transport network packets between a plurality of access devices and a plurality of edge routers. The method includes outputting, with a centralized controller of a network, one or more messages to communicate and install within each of the aggregation nodes, forwarding information for establishing one or more transport LSPs for transporting the network packets between the access nodes and the routers via the aggregation nodes, wherein each of the aggregation nodes operates a reduced control plane without execution of a L3 routing protocol to maintain routing information for the aggregation networks and generate forwarding information for the aggregation node. The method also includes receiving network packets associated with a plurality of subscriber devices, and forwarding, with the plurality of aggregation nodes, the network packets along the LSPs between the access nodes and the edge routers.

In a further example, a method includes by an aggregation node of a plurality of aggregation nodes of a network, executing a control plane protocol to discover neighboring ones of the aggregation nodes of the network, and, by the aggregation node, sending flood messages to discovered local neighbor nodes toward a centralized controller network device to establish a Source Routed Tunnel (SRT) control channel between the aggregation node and the centralized controller network device. The method also includes receiving, by the aggregation node, a message from the controller via the established SRT control channel, wherein the message specifies directed Forwarding Information Base (FIB) state pre-computed by the centralized controller network device for configuring a forwarding plane of the aggregation node, and, responsive to receiving the message, and by the aggregation node, installing the directed FIB state received in the message, wherein the directed FIB state comprises one or more Multiprotocol Label Switching (MPLS) labels for the aggregation node to use for sending packets on an LSP.

In another example, a computer-readable storage medium includes instructions to cause a programmable processor to execute a control plane protocol on a processor of a network device to discover neighboring ones of a plurality of nodes of a network, send flood messages to discovered local neighbor nodes toward a centralized controller network device to establish a Source Routed Tunnel (SRT) control channel between the network device and the centralized controller network device, and receive, at the network device, a message from the controller via the established SRT control channel, wherein the message specifies directed Forwarding Information Base (FIB) state pre-computed by the centralized controller network device for configuring a forwarding plane of the aggregation node, The instructions further cause the programmable processor to, responsive to receiving the message, install the directed FIB state received in the message within a forwarding component of the network device, wherein the directed FIB state comprises one or more MPLS labels for network device to use for sending packets on an LSP.

In a further example, a network device includes a plurality of network interfaces to send and receive network packets, a forwarding component that provides a data plane to perform label operations on the network packet to forward of the network packets on label switched paths through a network, and a control unit executing a control protocol to discover neighboring nodes of a plurality of nodes of the network, send flood messages to discovered neighbor nodes toward a centralized controller to establish a Source Routed Tunnel (SRT) control channel between the network device and the centralized controller, and receive, from the centralized controller and via the SRT control channel, forwarding information for transporting the network packets along one or more transport label switched paths (LSPs) within the network.

The techniques described herein may provide certain advantages. For example, the techniques may allow a service provider to achieve a reduction in total operating cost through use of centralized control and use of nodes that are easy to manage and have no persistent configuration. As described herein, the techniques may be utilized within access networks to unify disparate edge networks into a single service delivery platform for business, residential and mobile applications. Moreover, the techniques provide an access network architected to easily scale with the number of subscriber devices. For example, ease of scaling may be achieved by limiting the size of the forwarding tables on the access nodes and aggregation nodes, and also limiting each node's awareness of other nodes to only its direct neighbors.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 9 is a block diagram illustrating an example Flood Message in accordance with the techniques of this disclosure.

FIG. 10 is a block diagram illustrating an example Neighbor Node List element of the Flood Message in further detail, according to one example.

FIG. 11 is a block diagram illustrating an example Intermediate Node List element of the Flood Message in further detail, according to one example.

FIG. 12 is a block diagram illustrating an example Flood Reply Message according to the techniques of this disclosure.

FIG. 13 is a block diagram illustrating an example SRT Down Message according to the techniques of this disclosure.

FIG. 14 is a block diagram illustrating an example Link Attributes TLV Format according to the techniques of this disclosure.

FIG. 15 is an example Multiprotocol Label Switching (MPLS) Forwarding Information Base (FIB) configuration Message according to the techniques of this disclosure.

FIG. 16 is a block diagram illustrating an example MPLS FIB Entry of MPLS FIB config message in further detail, according to one example.

FIG. 17 is a block diagram illustrating an example FIB Config Reply Message in accordance with the techniques of this disclosure.

FIG. 18 is a block diagram illustrating an example MPLS FIB Parse Status Entry of FIB Config Reply Message in further detail, according to one example.

DETAILED DESCRIPTION

Figure 1:
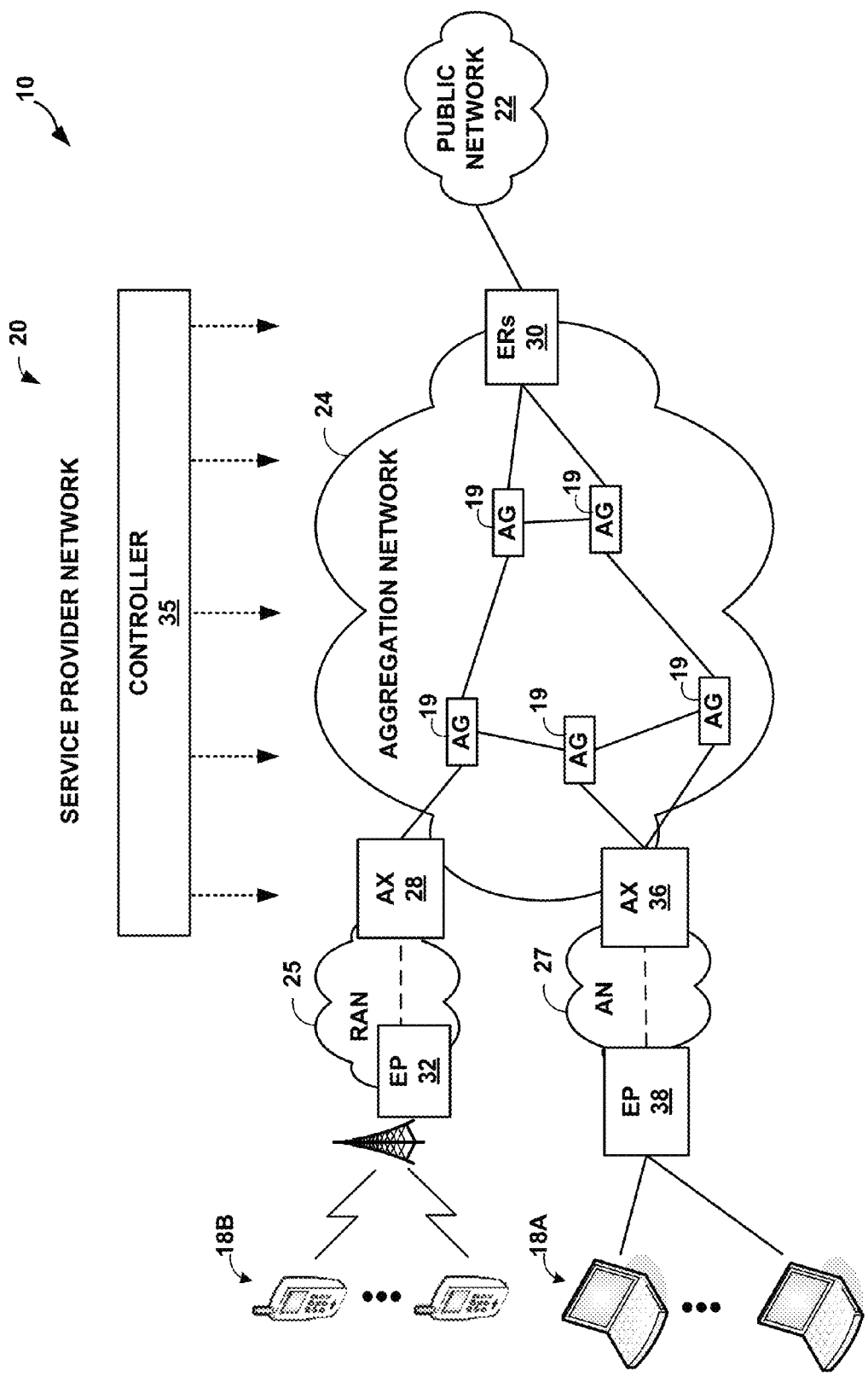
FIG. 1 is a block diagram illustrating an example network system in accordance with techniques described herein.

FIG. 1 is a block diagram illustrating an example network system 10 in accordance with techniques described herein. As shown in the example of FIG. 1, network system 10 includes a service provider network 20 coupled to a public network 22. Service provider network 20 operates as a private network that provides packet-based network services to subscriber devices 18A, 18B (herein, "subscriber devices 18"). Subscriber devices 18A may be, for example, personal computers, laptop computers or other types of computing device associated with subscribers. Subscriber devices 18 may comprise, for example, mobile telephones, laptop or desktop computers having, e.g., a 3G wireless card, wireless-capable netbooks, video game devices, pagers, smart phones, personal data assistants (PDAs) or the like. Each of subscriber devices 18 may run a variety of software applications, such as word processing and other office support software, web browsing software, software to support voice calls, video games, videoconferencing, and email, among others.

In the example of FIG. 1, service provider network 20 includes a centralized controller 35 that provides complete control-plane functionality for aggregation network 24. As described herein, controller 35 provides seamless end-to-end service from a core-facing edge of a service provider network through aggregation and access infrastructure out to access nodes located proximate the subscriber devices.

Aggregation network 24 provides transport services for network traffic associated with subscribers 18. Aggregation network 24 typically includes one or more aggregation nodes ("AG") 19, such as internal routers and switches that provide transport services between AXs 28, 36 and ERs 30. After authentication and establishment of network access through access network 27 or radio access network 25, any one of subscriber devices 18 may begin exchanging data packets with public network 22 with such packets traversing AXs 28, 36 and AGs 19. Although not shown, aggregation network may include other devices to provide security services, load balancing, billing, deep-packet inspection (DPI), and other services for mobile traffic traversing aggregation network 24.

As described herein, controller 25 operates to provide a central configuration point for configuring AGs 19 of aggregation network 24 provide transport services to transport traffic between AXs 28, 36 and edge routers 30. AGs 19 may, for example, operate as label switched routers (LSRs) that forward traffic along transport label switched paths (LSPs) defined within aggregation network 24. Access nodes 28, 36 and edge routers 30 may operate as endpoints for the LSPs to map subscriber traffic into and out of the LSPs. For example, edge routers 30 may map network services to individual LSPs within aggregation network 24, while access nodes 28, 36 map the network services to individual EPs 32, 38 via the LSPs.

In this way, controller 35 configures AGs 19 to effectively operate as MPLS switching fabric to provide transport LSPs from edge routers 30 to access nodes 28, 36 for transport of subscriber traffic. Each AX 28, 36 and AG 19 may provide minimal control plane function that is responsive to controller 35. As such, AX 28, 36 and AGs 19 may be lower cost and have a lower management complexity than conventional high-end routers typically used within an aggregation network since such devices often provide complex control-plane functions. Controller 35 traffic engineers the LSPs through aggregation network 24 according to the bandwidth, QoS and availability requirements of network services applications, as further described below.

As further described below, controller 35 includes a path computation module (PCM) that handles topology computation and path provisioning for the whole of aggregation network 24. That is, the PCM of controller 35 processes topology information for aggregation network 24, performs path computation and selection in real-time based on a variety of factors, including current load conditions of subscriber traffic, and provisions the LSPs within the aggregation network.

As described, each of AXs 28, 36, AGs 19, edge routers 30 and controller 35 executes a protocol, described herein as the Cloud Control Protocol (CCP), to simplify topology discovery and path provisioning process within aggregation network 24. As further described below, CCP provides a simple, highly available, scalable protocol for use within aggregation network 24 even though AXs 28, 36 and AGs 19 provide a limited control plane. In one example, CCP supports automatic discovery of neighboring AXs 28, 36 and AGs 19 with fast keep-alives and provides a mechanism by which any AXs 28, 36 and AGs 19 can describe its neighboring nodes to controller 35. For example, CCP provides an elegant mechanism for establishing a control channel by which controller 35 configures and controls AXs 28, 36 and AGs 19 within aggregation network 24. Moreover, CCP allows the control channel to be established independent of the data plane of aggregation network 24 being operational yet does not require a parallel control network. Further, CCP provides mechanisms for programming forwarding information into AXs 28, 36 and AGs 19 data planes, including MPLS forwarding information, detour next-hops, per CoS policers and per-interface packet scheduling.

Access nodes (AXs) 28, 36 and edge routers (ERs) 30 operate at the borders of aggregation network 24 and, responsive to controller 35, apply network services, such as authorization, policy provisioning and network connectivity, to network traffic associated with subscribers 18 in communication with access nodes 28, 36. In the example of FIG. 1, for ease of explanation, service provider network 20 is shown having two access nodes 28, 36, although the service provider network may typically service thousands or tens of thousands of access nodes.

Aggregation nodes 19 are nodes which aggregate several access nodes 28, 36. AGs 19 and AXs 28, 36 have reduced control planes that do not execute a Multiprotocol Label Switching (MPLS) protocol for allocation and distribution of labels for the LSPs. As one example, AXs 28, 36 and AGs 19 each execute a control-plane protocol, such as the CCP, to receive MPLS forwarding information directly from controller 35, without requiring conventional MPLS signaling using a label distribution protocol such as LDP or RSVP.

In this example, service provider network includes an access network 27 with an access node (AX) 36 and endpoint (EP) 38 that provide subscriber devices 18A with access to aggregation network 24. In some examples, AX 36 may comprise a router that maintains routing information between subscriber devices 18A and aggregation network 24. AX 36, for example, typically includes Broadband Remote Access Server (BRAS) functionality to aggregate output from one or more EPs 38 into a higher-speed uplink to aggregation network 24. Edge router 30 provides an anchor point of active sessions for subscriber devices 18A. In this sense, edge router 30 may maintain session data and operate as a termination point for communication sessions established with subscriber devices 18A that are currently accessing packet-based services of public network 22 via aggregation network 24.

EP 38 may communicate with AX 36 over a physical interface supporting various protocols. EP 38 may comprise a switch, a router, a gateway, or another terminal that operates as a demarcation point between customer equipment, such as subscriber devices 18B, and service provider equipment. In one example, EP 38 may comprise a digital subscriber line access multiplexer (DSLAM) or other switching device. Each of subscriber devices 18A may utilize a Point-to-Point Protocol (PPP), such as PPP over ATM or PPP over Ethernet (PPPoE), to communicate with EP 38. For example, using PPP, one of subscriber devices 18 may request access to aggregation network 24 and provide login information, such as a username and password, for authentication by policy server (not shown). Other embodiments may use other lines besides DSL lines, such as cable, Ethernet over a T1, T3 or other access links.

As shown in FIG. 1, service provider network 20 may include a radio access network 25 with an access node (AX) 28 and EP 32 that provide subscriber devices 18B with access to aggregation network 24 via radio signals. For example, EP 32 may be connected to one or more wireless radios or base stations (not shown) to wirelessly exchange packetized data with subscriber devices 18B. EP 32 may comprise a switch, a router, a gateway, or another terminal that aggregates the packetized data received from the wireless radios to AX 28. The packetized data may then be communicated through aggregation network 24 of the service provider by way of AGs 19 and edge routers (ERs) 30, and ultimately to public network 22.

Aggregation network 24 provides session management, mobility management, and transport services to support access, by subscriber devices 18B, to public network 22. Edge router 30 provides an anchor point of active sessions for subscriber devices 18B. Edge router 30 may maintain session data and operate as a termination point for communication sessions established with subscriber devices 18B that are currently accessing packet-based services of public network 22 via aggregation network 24. Examples of a high-end mobile gateway device that manages subscriber sessions for mobile devices are described in U.S. patent application Ser. No. 13/248,834, entitled MOBILE GATEWAY HAVING REDUCED FORWARDING STATE FOR ANCHORING MOBILE SUBSCRIBERS," the entire content of which is incorporated herein by reference.

In some examples, one or more of access network 27 and radio access network 25 may comprise an optical access network. For example, AX 36 may comprise an optical line terminal (OLT) connected to one or more EPs or optical network units (ONUs) via optical fiber cables. In this case, AX 36 may convert electrical signals from aggregation network 24 to optical signals using an optical emitter, i.e., a laser, and a modulator. AX 36 then transmits the modulated optical signals over one or more optical fiber cables to the CPEs, which act as termination points of the optical access network. As one example, EP 38 converts modulated optical signals received from AX 36 to electrical signals for transmission to subscriber devices 18A over copper cables. As one example, EP 38 may comprise a switch located in a neighborhood or an office or apartment complex capable of providing access to a plurality of subscriber devices 18A. In other examples, such as fiber-to-the-home (FTTH), EP 38 may comprise a gateway located directly at a single-family premise or at an individual business capable of providing access to the one or more subscriber devices 18A at the premise. In the case of radio access network 25, the EPs may be connected to wireless radios or base stations and convert the modulated optical signals to electrical signals for transmission to subscriber devices 18B via wireless signals.

As described herein, access networks 25, 27 may provide a comprehensive solution to limitations of current access networks. In one example, AXs 28, 36 provide optical interfaces that are each capable of optically communicating with a plurality of different endpoints through a common optical interface. Access node 36 may, for example, communicate with EPs 38 through a passive optical network using wave division multiplexing. Further, EPs 32, 38 may be low-cost, optical emitter-free EPs that incorporate a specialized optical interface that utilizes reflective optics for upstream communications. In this way, multiple EPs 38 are able to achieve bi-directional communication with access router 36 through a single optical interface of the access router even though the EPs are optical emitter (e.g., laser) free. In some examples, access networks 25, 27 may further utilize optical splitters (not shown) for the optical communications associated with each of the different wavelengths provided by the optical interfaces of access nodes 28, 36.

In some examples, the optical interfaces of access nodes 28, 36 provide an execution environment for a plurality of schedulers, one for each port of the comb filter coupled to the optical interface, i.e., one for each wavelength. Each scheduler dynamically services data transmission requests for the set of EPs 32, 38 communicating at the given wavelength, i.e., the set of EPs coupled to a common port of the comb filter by an optical splitter, thereby allowing the access network to dynamically schedule data transmissions so as to utilize otherwise unused communication bandwidth. Further example details of an optical access network that uses wave division multiplexing and dynamic scheduling in conjunction with emitter-free EPs can be found in U.S. Provisional Patent Application "OPTICAL ACCESS NETWORK HAVING EMITTER-FREE CUSTOMER PREMISE EQUIPMENT AND ADAPTIVE COMMUNICATION SCHEDULING," filed Dec. 16, 2012, the entire contents of which are incorporated herein by reference.

The techniques described herein may provide certain advantages. For example, the techniques may allow a service provider to achieve a reduction in total operating cost through use of centralized controller 35 in conjunction with high-speed aggregation nodes 19 that are easy to manage and have no persistent configuration. Moreover, the techniques may be utilized within aggregation networks to unify disparate edge networks into a single service delivery platform for business, residential and mobile applications. Moreover, the techniques provide an aggregation network architected to easily scale as the number of subscriber devices 18.

Figure 2:
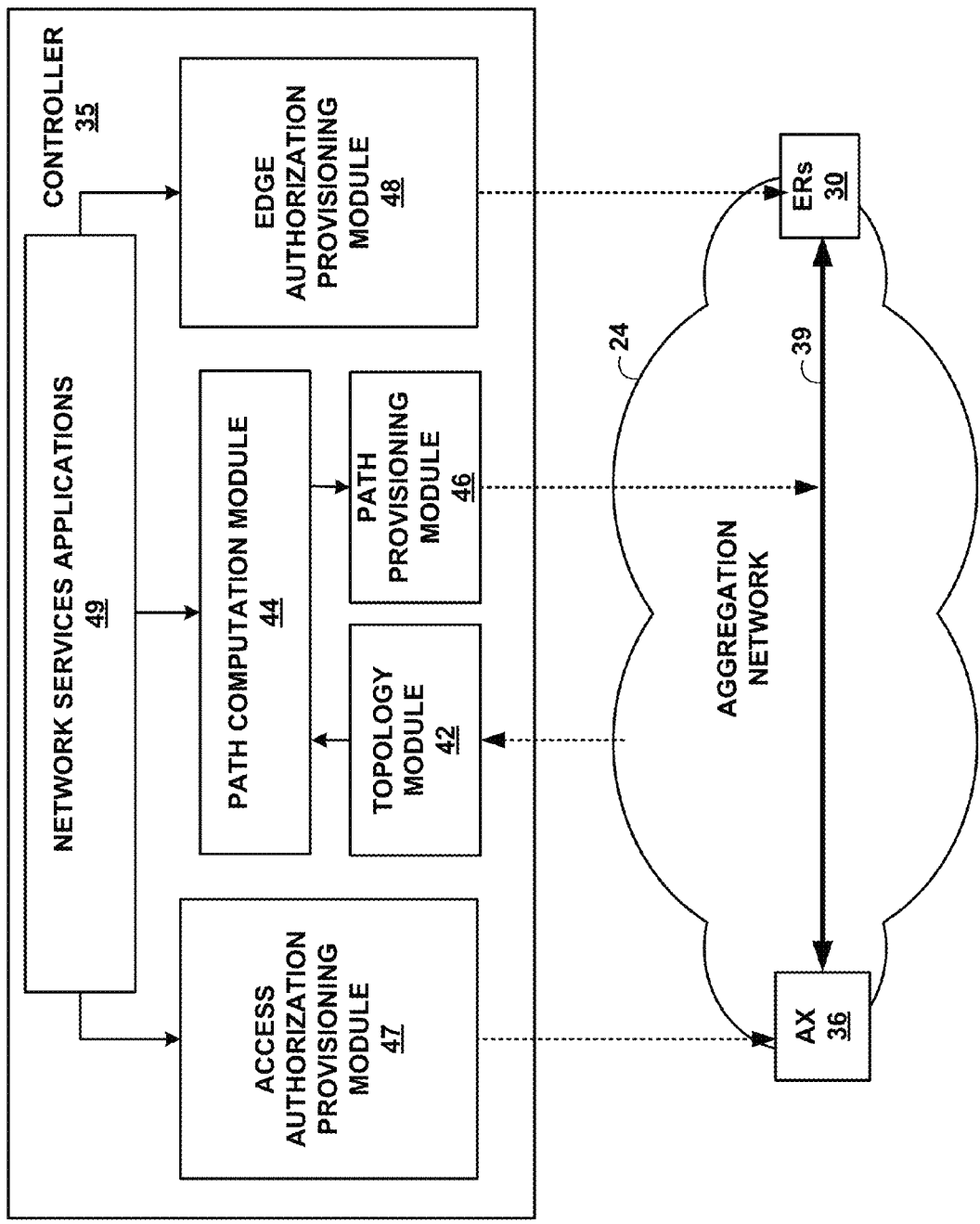
FIG. 2 is a block diagram providing a second illustration of a service provider network in which further example details of a centralized controller are shown.

FIG. 2 is a block diagram providing a second illustration of service provider network 20 further example details of controller 35 are shown. In this example, controller 35 provides an operating environment for topology module 42, path computation element 44, path provisioning module 46, access authorization provisioning module 47, edge authorization provisioning module 48, and network services applications 49.

In some instances, topology module 42 provides an interface by which controller 35 receives topology information from aggregation network 24. Topology module 42 may, for example, utilize a software defined networking (SDN) protocol to receive topology information from one or more of edge routers 30, where the edge routers automatically discover the topology of aggregation network 24 in accordance with the CCP described herein. One primary example of an SDN protocol is "OpenFlow," which is a communication protocol that provides direct access to the data plane of a network switch or router. In some instances, may receive messages from edge routers 30 in accordance with an SDN protocol where payloads of the SDN message encapsulate CCP messages. In other examples, topology module 42 may receive CCP messages directly from AXs 28, 36 and AGs 19 and/or edge routers 30. Further example details of the OpenFlow protocol is described in "OpenFlow Switch Specification," Open Networking Foundation, Version 1.2, Dec. 5, 2011, incorporated herein by reference.

Otherwise stated, in some examples, topology module 42 may receive topology information from the edge routers of the network, and a path computation module (PCM) 44 computes the forwarding information for transport label switched paths (LSPs) in accordance with the topology information. In other examples, topology module 42 may receive the topology information from a centralized topology database. In a further example, topology module 42 may execute an interior routing protocol to receive the topology information from the edge routers 30.

As further explained below, in one example implementation, path computation module 44 handles topology computation for the whole of aggregation network 24 and programs forwarding information into AGs 19, AXs and ERs by way of path provisioning module 46. Like topology module 42, path provisioning module 46 may utilize an SDN protocol or the CCP to communicate forwarding information to AGs 19, AXs and ERs for configuring data planes of the AGs, AXs and ERs.

Access authorization and provisioning module 47 programs authorization, policy provisioning information records as well as packet policers into access nodes, such as AX 36. Similarly, edge authorization and provisioning module 48 programs authorization, policy provisioning information records as well as packet policers into edge routers 30. Network services applications comprises applications for governing and controlling the distribution of such control information to the access nodes and the edge routers. Further exemplary details of controller 35 are described below.

As further described below, the cloud control protocol (CCP) allows network nodes to discover their neighbors and report these neighbors to a controller. At the controller, the topology of the network may be computed. Given this topology, the controller may then compute paths through the network and then install forwarding tables in the network nodes to support packet switching between any two nodes in the network. This protocol does not rely on the data plane to be established before the topology can be discovered. A control channel is established independent of the data channel.

In one example, the Cloud Control Protocol may enable controller 35 to provide certain advantages. First, as one example, CCP may enable controller 35 to simplify the implementation of network nodes, such as the aggregation nodes and access nodes described herein. The network nodes need not each execute a routing protocol that learns routing information and generates forwarding information for the network node device. For example, each of the aggregation nodes and access nodes may utilize the CCP protocol to automatically discover its neighbors and to report those neighbors to a controller. Second, use of the Cloud Control Protocol may enable controller 35 to centralize the complex functions of topology discovery, path selection and traffic engineering. Centralization may help achieve the goal of maintaining simplicity of each individual aggregation node and access nodes, e.g., by removing complex control-plane software from each of the aggregation nodes and access nodes. Centralization may also allow for deterministic provisioning of TE paths and their failure paths through the network. In some instances, centralized path computation by controller 35 may by simpler than distributed computation and may converge more quickly. Centralization may also allow an entire aggregation network to be controlled and managed from a single entity, e.g., a set of one or more controllers, thereby simplifying and enhancing operations by providing a high-level view of the aggregation network. Third, use of CCP may enable separation of the control protocol from the paths used by the dataplane, so that even when there are failures, the control protocol is robust enough to continue to operate. In addition, a centralized algorithm will not have convergence issues and is deterministic.

Figure 3A:
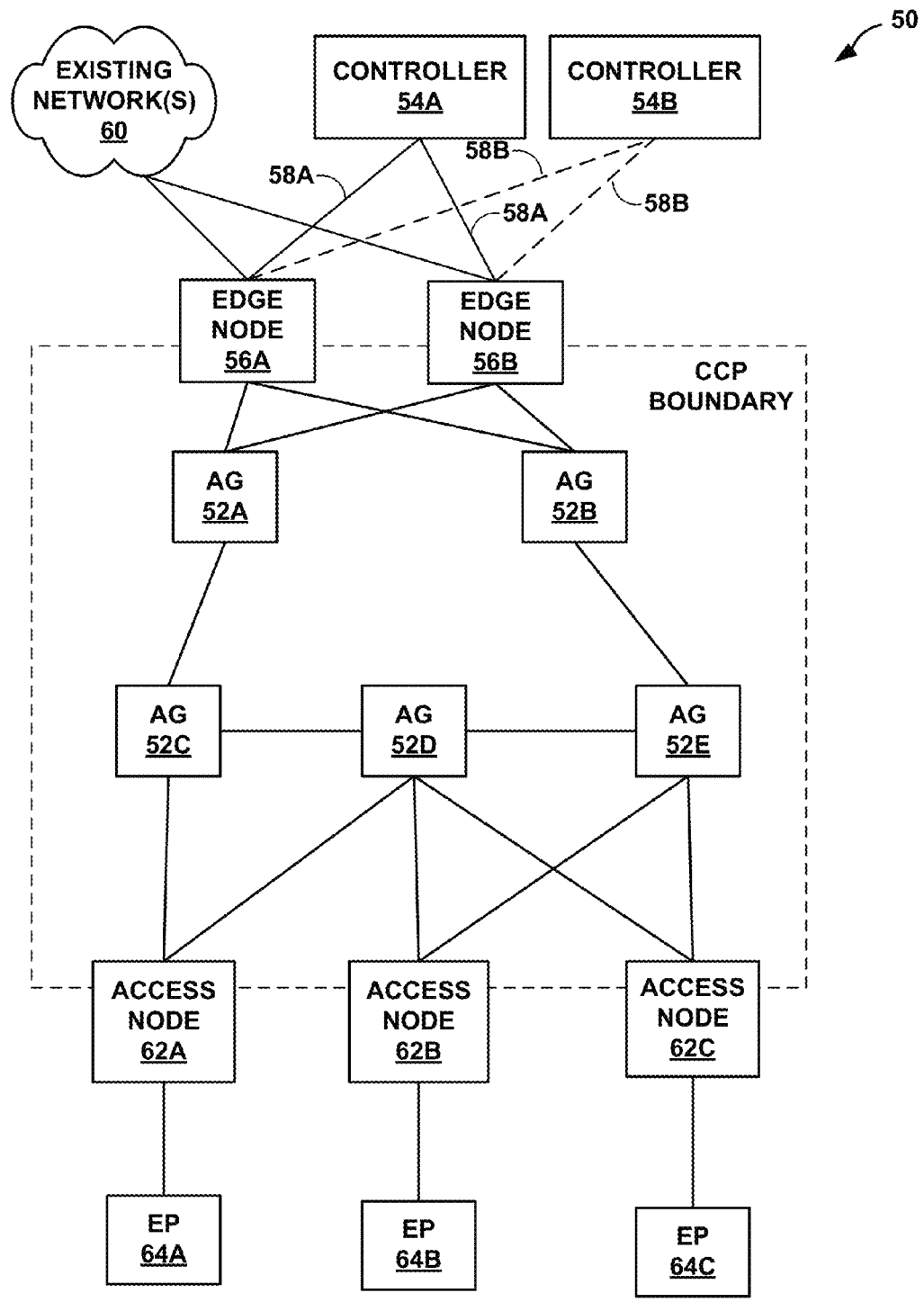
FIG. 3A is a block diagram illustrating a system including a collection of Access Nodes and Aggregation Nodes to be discovered by a controller using the Cloud Control Protocol according to the techniques of this disclosure.

FIG. 3A is a block diagram illustrating the basic architecture of a system including a collection of Aggregation Nodes "AG" 52A-52E (hereinafter "Aggregation Nodes 52") and access nodes 62A-62C (hereinafter, access nodes 62) to be discovered by a controller 54A or 54B (hereinafter, "controllers 54") using the Cloud Control Protocol (CCP), according to the techniques of this disclosure. CCP is designed to allow the topology of a collection of network-nodes connected via point to point links to be discovered by a controller.

Controllers 54 represent the CCP Controller entity and may, for example, represent controller 35 of FIGS. 1 and 2. In this example, one of the controller's function is to receive neighbor reports from network nodes and from these reports to compute topology and path information. In one example, controller 54 may be IP-reachable from the edge nodes 56A-56B (hereinafter, "Edge Nodes 56") and therefore may communicate to the Edge Nodes 56 via a UDP connection. In the example of FIG. 3A, controllers 54A and 54B are deployed in redundant pairs with active/standby semantics. Other examples may include a single controller 54 without a redundant pair, or may include a set of three or more controllers 54 operating to provide centralized control.

FIG. 3A includes Aggregation Nodes 52, which may also be referred to herein as network nodes, and may represent aggregation nodes 19 of aggregation network 24 of FIG. 1. The Aggregation Nodes 52 and access nodes 62 discover neighboring Aggregation Nodes 52 and report those neighbors to the controller(s) 54 using a flooding mechanism, as described herein. Aggregation Nodes 52 are connected to one another via point to point links. In some examples, Aggregation Nodes 52 are assumed to have at least one Ethernet MAC address that is used as a globally unique identifier. Nodes have CCP Links that are indexed locally.

Edge Nodes 56 are a special case of the Aggregation Nodes 52. The Edge Nodes 56 has a connection (virtual connection 58A, 58B) to the controllers 54 and all packets from the controllers 54 to any node in the cloud may utilize this connection. In one example instance, Edge Nodes 56 terminate the flooding and forwards all Flood packets received to the CCP controllers 54. The edge nodes 56 are also connected to existing network(s) 60 (e.g., core networks), and may provide a connection for receiving network services from existing networks 60, for example.

Aggregation Nodes 52 can provide label switched path (LSP) transport between Edge Nodes 56 and access nodes 62A-62C (hereinafter, access nodes 62). Edge nodes 56 map network services to the LSPs. Access nodes 62 map network services via the LSPs to End Points (EP) 64A-64C (hereinafter, "end points 64"). For example, end points 64 may include network devices such as routers, base stations, 802.11 access points, IP hosts, and other network devices.

Example operation of one implementation of CCP is as follows. Aggregation Nodes 52 and access nodes 62 discover their neighbors by sending Hello messages on all of their CCP links. The examples described below with reference generally to "nodes" are applicable to both aggregation nodes and access nodes. The links may be any type of computer network transmission medium. For instance, a link may be a fiber optic cable, an Ethernet cable, a wireless connection, and so on. When a Hello Reply is received, a neighbor is discovered. Once a neighbor is discovered on a link, the link is declared as active and it is added to a "neighbor set" for that node. A neighbor set is defined herein as a set specifying each of the active interfaces and an identifier of the neighbor reachable by the interface. The neighbor set is then flooded across all active links via a Flood packet.

In one example, a Flood packet contains a generation number, the neighbor list and an intermediate node list that is initially empty. The Flood packet is sent out all active links. The receiver of the Flood packet first checks to see if the receiver is on the intermediate node list. If it is on the list this implies that the packet has visited the node before, and the packet is dropped. If the receiver of the Flood packet is not on the list, the node adds itself to the list and then floods the packet out all active links other than its ingress link.

In some examples, the Edge Nodes 56 do not flood Flood packets out of their active links. Instead, edge nodes 56 send Flood packets directly to the controller 54A. When the controller 54A receives the Flood packet, controller 54A compares the generation number against the current generation number received for that node. If the generation number is newer, controller 54A updates the neighbor list and the path to the node. The path to the node is computed by reversing the path the Flood packet took as recorded in the intermediate node list. This path is referred to as a Source Routed Tunnel (SRT) and is used for the duration of this generation number for all CCP communications with the node.

The controller 54A responds to the first Flood packet of a given generation number by issuing a Flood Reply via the SRT to the node. When a node receives a Flood Reply which carries the Source Route List, it now has an SRT back to the controller 54A. At this point the controller 54A and the node are in sync with respect the node's neighbor list and the SRT used to send additional CCP control messages. The node sends Keepalive packets to the controller 54A to ensure the state of the SRT. The controller 54A responds with a Keepalive Reply. If no Keepalive Reply occurs, the node generates a new Flood packet with a new generation number to force the acceptance at controller 54A of a new SRT. The SRT control channel may now be used to program the forwarding plane of node via other control messages.

In one example, the CCP may include features such as being simple, highly available, and scalable. The CCP can support neighbor discovery with fast keep-alives. CCP provides a mechanism whereby a node can describe its neighbors to a controller. CCP allows for Establishing a Control Channel independent of the data plane being operational yet does not require a parallel control network. CCP provides FIB programming facilities for MPLS LER and LSF functions including detour next-hops, per CoS policers and per-interface packet scheduling. CCP runs over the standard Ethernet MAC or simulations thereof.

HELLO, HELLO_REPLY messages may be exchanged over Ethernet interfaces to discover and maintain neighbor state. Messages include the node specific interface index so that the global topology may be understood.

The FLOOD feature is used to discover a path from the node to the controller 54. The FLOOD message generated by a node includes the node's Neighbor Node List (NNL). As the FLOOD progresses towards the Edge Node 56, each node MAC and its ingress and egress interfaces are recorded in the FLOOD message as the Intermediate Node List (INL). The Intermediate Node List serves as Source Route List (SRL) when the FLOOD arrives at the controller. The Source Route List establishes a Source Route Tunnel (SRT) that hence forth serves as the control channel between the controller and the node. Edge Nodes 56 do not flood FLOOD messages but rather send them directly to the controller 54. When a node receives a FLOOD message it will forward it along its SRT path toward the controller, otherwise it will drop it. This is a scaling optimization. A new FLOOD is generated for each Neighbor List state change. Each new FLOOD message includes a generation number.

Figure 3B:
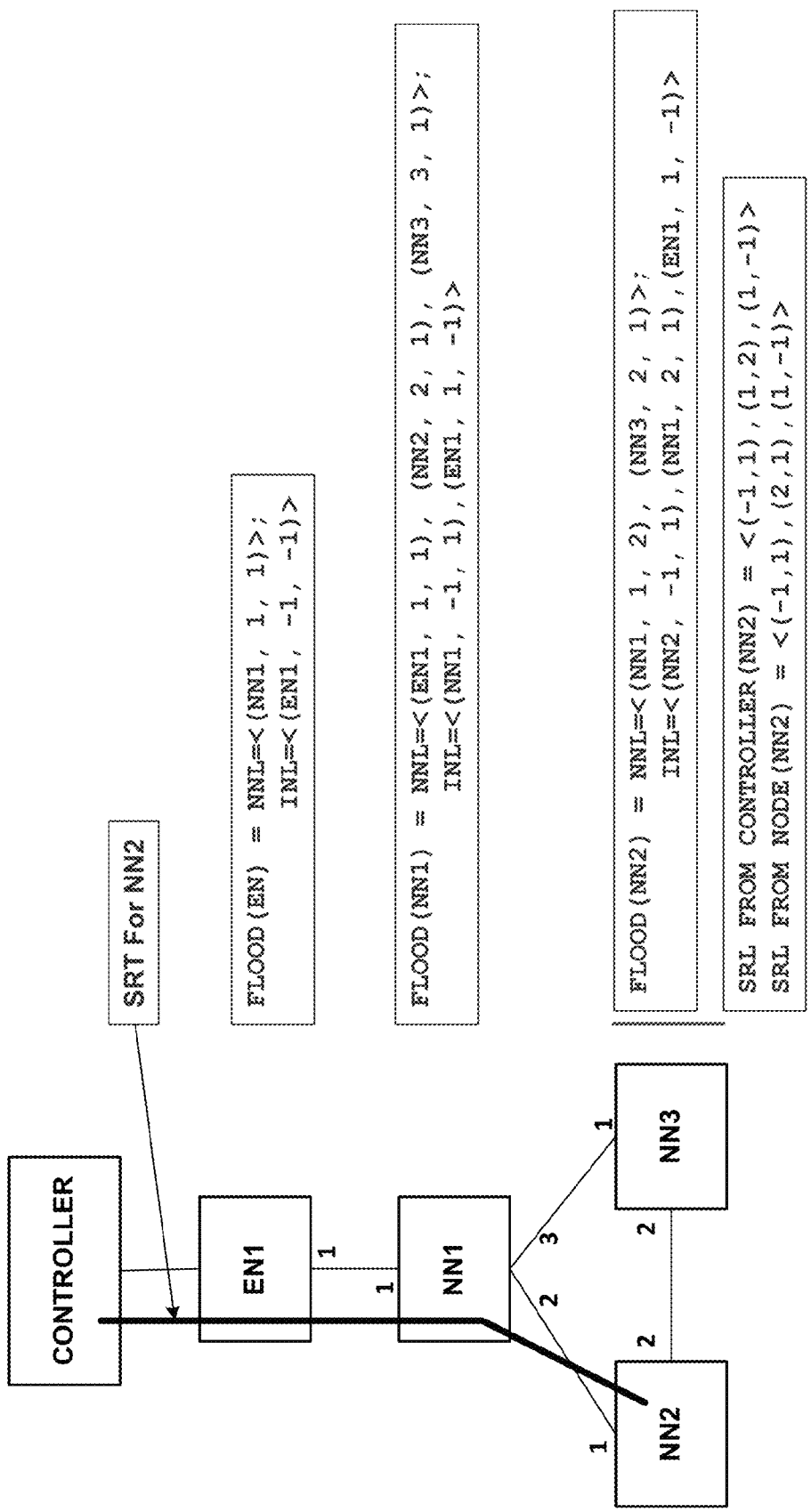
FIG. 3B is a block diagram illustrating example network devices that exchange example FLOOD messages along the SRT path from the controller, in accordance with the techniques of this disclosure.

FIG. 3B is a block diagram illustrating example network devices that exchange example FLOOD messages along the SRT path from the controller, in accordance with the techniques of this disclosure. The network devices of FIG. 3B may be similar to those of FIG. 3A. For example, network nodes ("NN") 1-3 may be aggregation nodes or access nodes as in FIG. 3A. FIG. 3B shows example NNLs and INLs of the FLOOD messages according to one example operation.

As explained in further detail below, in on example, the Flood packet contains a generation number, the neighbor list (NNL) and an intermediate node list (INL) that is initially empty. Each list contains a set of records, each of the records specifying a node identifier, an input interface of the current node for reaching the identified node, and an output interface of the identified node from which the Flood packet was output. A value of "−1" indicates that the Flood packet originated at that list. The Flood packet is sent out all active links. The receiver of the Flood first checks to see if it is on the intermediate node list. If it is on the list this implies that the packet has visited the node before, and the packet is dropped. If it is not on the list, the node adds itself to the list and then floods the packet out all active links other than its ingress link. In this way, the FLOOD messages allow the controller to compute a source route list that defines a path to the originating node by simply reversing the path the Flood packet took as recorded in the intermediate node list. This path is referred to herein as a Source Routed List (SRL) or a Source Routed Tunnel (SRT).

Other messages are exchanged using the CCP. For example, the FLOOD_REPLY message confirms the FLOOD and establishes the SRT between the edge node 56, access node 62, or aggregation node 52, and the controller 54. The KEEP_ALIVE, KEEPALIVE_REPLY messages Maintain the Source Routed Tunnel.

The SRT_DOWN message informs the sender that the SRT is Down. Controllers 54 are configured to wait for the SRT to be rebuilt before sending control requests. Nodes know to regenerate their FLOOD messages. SRT_DOWN may improve Convergence rates after a node or link failure.

MPLS_FIB_CONFIG message Configures forwarding entries for LSRs and LERs, and optionally configures a detour for the entry. MPLS_FIB_CONFIG message is computed by the Path Computation Module (PCM) at the controller 54. The PCM may compute forwarding information for transport LSPs in accordance with topology information.

POLICER_CONFIG message Configures a policer at the LER based on CoS specific bandwidth provisioning. COS_SCHED_CONFIG message Configures the CoS scheduler for each CCP interface based on CoS specific bandwidth allocated from that interface.

CCP Advantages versus other protocols: Automatic Control Channel establishment independent of data plane. There is no need to provide a parallel control network. Versus OpenFlow where these issues are not addressed. Minimal Control plane complexity versus IGPs. Only maintains local neighbor state and directed FIB state. Better control plane scaling versus IGPs. The entire routing table is not flooded to all nodes. Convergence issues are reduced via the controller. No soft state, rollback issues versus RSVP. Minimal Forwarding plane functionality versus OpenFlow. MPLS with detour path support. Simpler switching silicon. Plug and Play, no on-box configuration.

Figure 21:
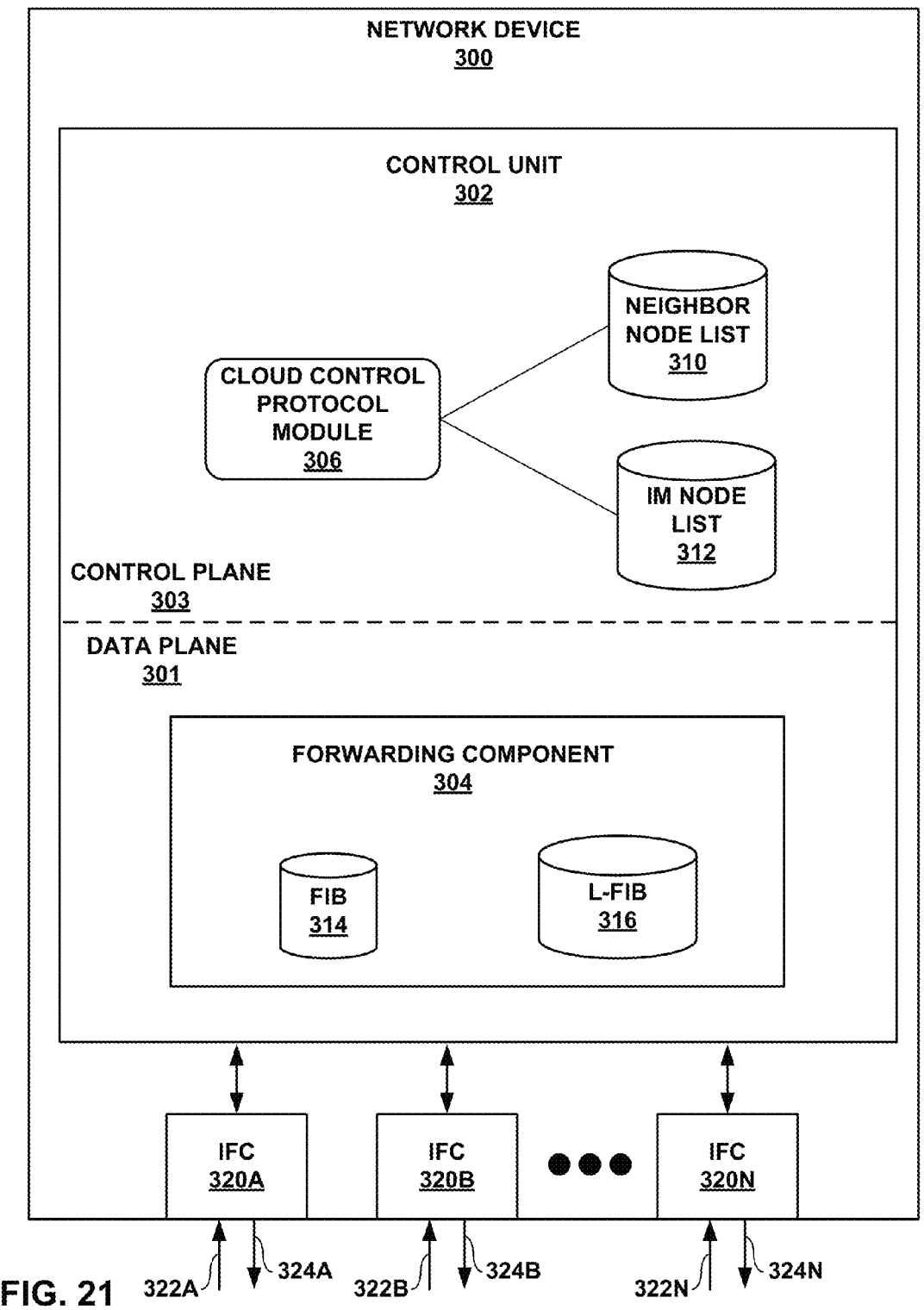
FIG. 21 is a block diagram illustrating an example network device in accordance with this disclosure.

Various example Control Packet Formats will now be described. With reference to FIGS. 1 and 21, for example, these control packets may be exchanged between controller 35 and access nodes 28, 26, between controller 35 and aggregation nodes 19, and between controller 35 and network device 300, for example.

Figure 4:
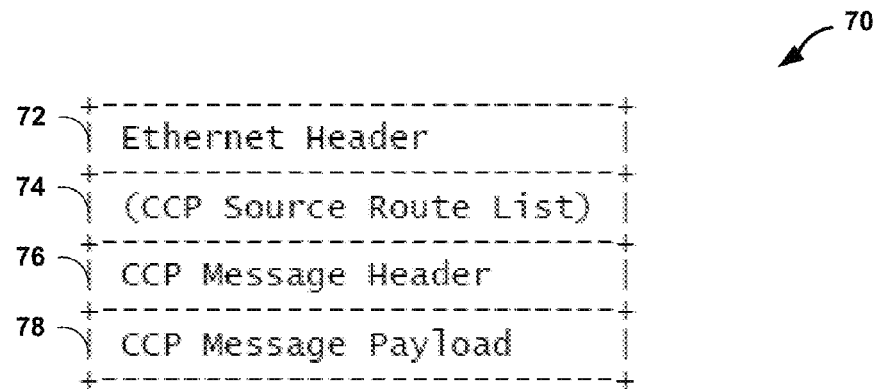
FIG. 4 is a block diagram illustrating an example Base Packet structure for a control packet according to the techniques of this disclosure.

In one example embodiment, the control packets have the structure illustrated in FIG. 4. FIG. 4 is a block diagram illustrating an example Base Packet Structure 70 for a control packet according to the techniques of this disclosure.

The Ethernet Header 72 is a standard Ethernet II header. The Ethernet header 72 is used so that the CCP Control plane can be run natively over standard Ethernet interfaces. If other physical or logical interfaces are used, the only requirement placed on those interfaces is that they can transport an Ethernet frame. Generally, the source MAC address is the address of the sending node and the destination address is the address of the receiving node or all Fs in the case of broadcast (Flood) packets. The Ether type is TBD1 (currently using 0xA000) for packets without a Source Route List and TBD2 (0xA001) for packets with a Source Route List.

CCP Source Route List 74 is an optional field. CCP Source Route List 74 inclusion is dependent on the type of message. CCP Source Route List 74 is present in messages that are sent using an SRT. CCP Source Route List 74 is an ordered list of node specific ingress and egress link indexes that are used by nodes to source route a packet from one node to another. The CCP Message Header 76 includes the message type. CCP Message Payload: The CCP Message Payload 78 is the payload for the specified message type.

Figure 5:
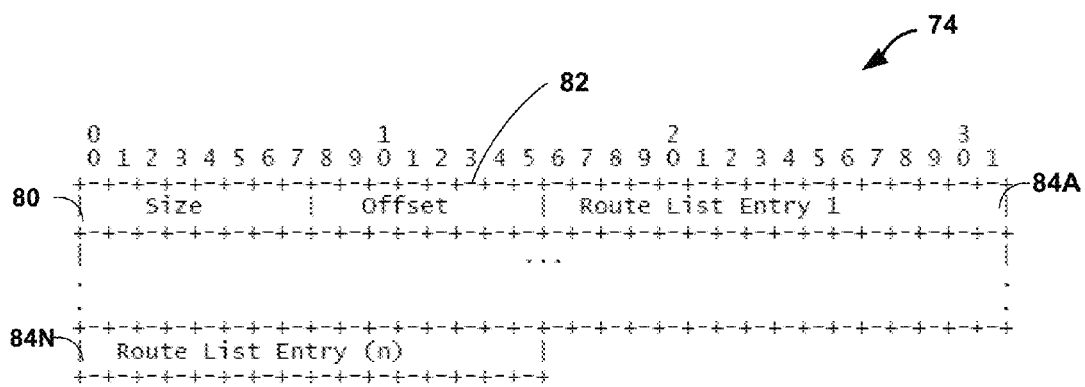
FIG. 5 is a block diagram illustrating an example CCP Source Route List field in further detail, according to one example embodiment.

FIG. 5 is a block diagram illustrating an example CCP Source Route List field in further detail, according to one example embodiment. The Source Route List is a list of ingress and egress link indexes from the starting node to the terminating node, inclusive. As there is no ingress interface as the starting node, the special link index 0xFF is used to indicate that this is the initial node. As there is no egress link at the terminating node the egress link index is set to 0xFF indicating the list has terminated and the node should consume the packet.

Size field 80 includes the total size in bytes of all the route list entries. Offset field 82 includes the Offset in bytes into the Route List Entry List. Offset field 82 is initialized to 0 from the control plane of the sending node and incremented by 2 by each node including the sending node as the packet is transmitted out the egress link. The Route List Entry (RLE) fields 84A-84N include the ingress and egress link indexes for the receiving node. When an SRT packet is received its ingress link index MUST match the ingress link index specified in the RLE.

Figure 6:
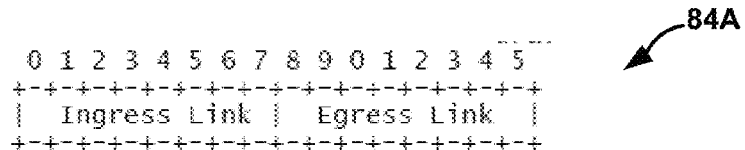
FIG. 6 is a block diagram illustrating an example Route Entry List field in further detail, according to one example embodiment.

FIG. 6 is a block diagram illustrating an example Route Entry List field 84A in further detail, according to one example embodiment. The structure of the route list entry is as follows. An Ingress Link field specifies the link the packet should ingress from. An Egress Link field specifies the link the packet should egress to.

Figure 7:
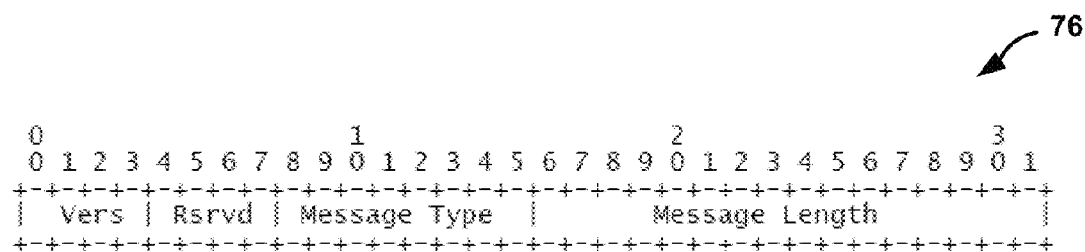
FIG. 7 is a block diagram illustrating an example CCP Message Header in further detail, according to one example embodiment.

FIG. 7 is a block diagram illustrating an example CCP Message Header 76 in further detail, according to one example embodiment. The CCP Message Header 76 is used to identify the CCP message type. CCP Message Header 76 has the structure shown in FIG. 7. The version field ("Vers") includes the version number of the protocol. This document defines protocol version 1. The Reserved field ("Rsrvd") is reserved and must be set to zero and ignored by the receiver. The Message Type field specifies the CCP message type. The Message Length field specifies the length of the Message Payload.

Figure 8:
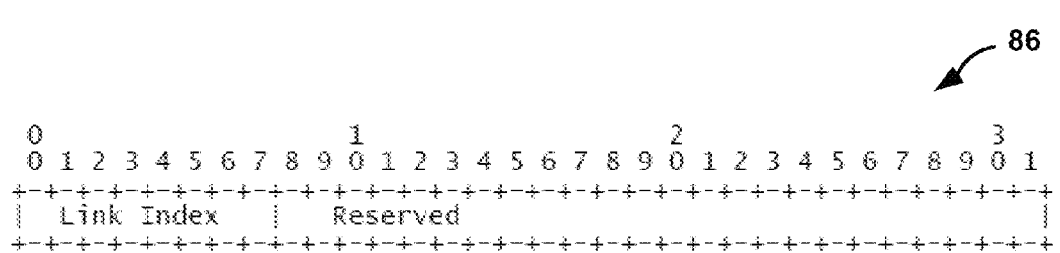
FIG. 8 is a block diagram illustrating an example Hello Message in accordance with the techniques of this disclosure.

According to some example embodiments, the following CCP message types are defined:
1: Hello
2: Hello Reply
3: Flood
4: Flood Reply
5: Keepalive
6: Keepalive Reply
7: SRT Down
8: MPLS FIB Config
9: MPLS FIB Config Reply FIG. 8 is a block diagram illustrating an example Hello Message 86 in accordance with the techniques of this disclosure. The Hello message 87 is link-local broadcast message is used to discover a neighbor across a point to point link. A node sends a hello message periodically on its links at a rate chosen by the sending node. The hello message is used for both discovery and to determine the liveness of the link. In one example aspect, the source address of the Ethernet header MUST be the MAC address of the sending node and the destination address MUST be all Fs.

In one example, the Hello message has the following structure as shown in FIG. 8. The Link Index field specifies the senders Link Index. The link index is local to the sender. Links are indexed from 0 to 0xFE. The Link Index of 0xFF is reserved for the control plane of the node. Therefore CCP nodes are restricted to 255 interfaces. The Reserved field is reserved and must be set to zero and ignored by the receiver.

The Hello Reply message (not shown) is a unicast message used to reply to a Hello is set to active by the receiver. The sender of the Hello Reply message sets the Source Address of the Ethernet Header to its MAC address. The sender sets the Destination address of the Ethernet Header to the Source Address of the corresponding Hello message. The Hello Reply message is sent on the same link from which the Hello message was received. The structure of the Hello Reply message is the same as the Hello message. The Link Index is set to the local link index on which the corresponding Hello message was received.

FIG. 9 is a block diagram illustrating an example Flood Message 88 in accordance with the techniques of this disclosure. The Flood message 88 is generated by a node when its neighbor list changes or when its currently active SRT times out. In either case, a new generation number is generated. The Flood message 88 is periodically sent until its corresponding Flood Reply is received.

In one example, the Flood message has the following structure as shown in FIG. 9.

The Instance ID is a unique number for the instance of the node. A node should generate a new instance ID each time it reboots or otherwise resets its software state. The instance ID is used to disambiguate a Flood message with the same generation number between resets. The instance ID may be a random number or a monotonically increasing integer for nodes having some ability to store information between reboots.

The Generation Number is a monotonically increasing number. The controller ignores any Flood message with a generation number less than the most recently received generation number (unless the R bit is set).

The Intermediate Node List (INL) Start is the offset from the beginning of the CCP Message Payload to the start of the Intermediate Node List. This offset is required since the Neighbor Node List is variable in length. The INL End is the offset from the beginning of the CCP Message Payload to the end of the Intermediate Node List. The Neighbor Node List element 90 is the list of Neighbors associated with this node. Each element in the list includes the Neighbor's MAC address, the local link index on which a Hello Reply message was received and the Neighbor's link index as indicated in the Hello Reply message. The Intermediate Node List element 92 includes the MAC addresses and their corresponding ingress and egress links through which this packet traversed en route from the originating node to the terminating edge node (EN) inclusive.

FIG. 10 is a block diagram illustrating an example Neighbor Node List element 90 of the Flood Message 88 (FIG. 9) in further detail, according to one example. In this example, the Neighbor Node List element 90 has the following structure:

Neighbor MAC Address specifies the MAC Address of the neighbor as reported in the Ethernet Source MAC of the Hello Reply Message. The Local Link field specifies the local link index over which the Hello Reply was received. Remote Link: The remote link index as reported in the Link Index of the Hello Reply packet.

FIG. 11 is a block diagram illustrating an example Intermediate Node List element 92 of the Flood Message 88 (FIG. 9) in further detail, according to one example. In this example, the Intermediate Node List element 92 has the following structure:

Intermediate MAC Address field specifies the MAC address of a node that received the Flood Message and re-flooded the packet. Ingress Link field specifies: The index of the link on which the packet was received. Egress Link field specifies: The index of the link on which the packet was sent. Note that when the packet is flooded, the Egress Link is modified for each link over which the packet is sent.

FIG. 12 is a block diagram illustrating an example Flood Reply Message 92 according to the techniques of this disclosure. The Flood Reply message is sent by the controller to acknowledge receipt of the Flood packet. The Flood Reply is sent via an SRT indicating that there is an SRL preceding the message payload. See FIG. 3B.

In one example, the Flood Reply Message Structure is as shown in FIG. 12. The Generation number is used to correlate the Flood Reply with the original Flood message. In one example, if the Generation number does not match the current generation number, the node MUST discard the message. If they do match, the node MUST initiate keepalive processing on the reversed SRT associated with this Flood Reply message.

In some aspects, a Keepalive message is used to maintain liveness of an SRT. The Keepalive message is periodically sent by a node after it has received a Flood Reply for the current generation number. The Keepalive message is sent via an SRT from a node to the controller. Otherwise, the Keepalive message has no additional content.

A Keepalive Reply message is sent by the controller upon receiving a Keepalive message. The Keepalive Reply message has no content. The Keepalive Reply message is sent via an SRT to the sender of the corresponding Keepalive message.

A SRT Down message (see FIG. 13) may be used to indicate to a sending node that the SRT over which it has sent packet has broken. This SRT Down message may provide immediate feedback to the sender that the SRT is down. With this indication, the sender does not have to wait for a keepalive timeout before taking corrective action. When an aggregation node 52 (FIG. 3) or access node receives an SRT Down message, in some examples the aggregation node 52 or access node will increment its generation number and generate a new Flood Message to establish a new SRT with the controller 54A.

In some examples, when a controller 54A receives an SRT Down message controller 54A may modify its state for the effected node such that the next Flood Message from the node of equal to or greater than generation number is immediately accepted. This avoids the condition where a Flood Reply for a given generation number is not able to follow the SRT specified and all Floods from the node would be ignored since they specify a different INL.

In one example, the node detecting the SRT Down may construct the SRT Down message according to the follow procedure:

a. Construct an Ethernet header where the Source MAC is set to the MAC of the node sending the SRT Down message. The Destination MAC is set as the MAC address of the original packet.

b. Construct a new Source Route List where the size is equal to the offset of the original packet, the offset is set to 0, and the RLE entries are the reversal of the RLEs in the original packet up the packets offset value. The first RLE entries ingress interface index is set to 0xFF.

c. Add a new Message Header with CCP message type SRT Down and d. Set the SRT Down reason code.

e. Append the first 256 bytes of the original packet including the Ethernet Header, the Source Route List, the Message Header and the Message Payload FIG. 13 is a block diagram illustrating an example SRT Down Message 96 according to the techniques of this disclosure. In the example of FIG. 13, the SRT Down Message 96 has the following structure.

The SRT Down Reason Code specifies the reason the SRT went down. Example choices include:

| | |
|---|---|
| 0 | Reserved |
| 1 | Neighbor at egress link index is down |
| 2 | Invalid egress link index for this node |
| 3 | Invalid ingress link index for this node |

A Link Attributes Message is sent by a node to describe its link attributes to the controller. In some examples, link attributes only describe locally discoverable characteristics of links such as maximum bandwidth or link type. Logical characteristics of links such as link coloring, shared resource groups or metric values are not something a node describes, but could be something associated with the link at the controller via mechanisms such as configuration. Generally Link attributes are attributes that effect traffic engineering calculations.

In some examples, Link Attributes are encoded as TLVs to support extensibility. FIG. 14 is a block diagram illustrating an example Link Attributes TLV Format 98 according to the techniques of this disclosure. In this example, Link Attribute fields are described using a set of Type/Length/Value triplets. The TLV is not padded to four-octet alignment; Unrecognized types are ignored.

One example Link Attribute TLV Structure is shown in FIG. 14. The Type field lists the TLV Type. Example types may include types such as the IS-IS types described in H. Gredler, "Advertising Link-State Information in BGP," Inter-Domain Routing Internet Draft, draft-gredler-bgp-to-01, Jul. 11, 2011, the entire contents of which are incorporated by reference herein. The Length field defines the length of the value portion in octets (thus a TLV with no value portion would have a length of zero).

The Value field specifies the Contents of TLV. See the specific TLV description for more information. A Max Bandwidth Link Attribute may be a 32 bit floating point BW in Bytes per second. A RF Group Link Attribute may be some unique ID that ties this link to some other link for which BW is being shared. An Expected Transmission Time specifies the time expected to transmit a packet of 1K bytes across the link. Time is measured in microseconds and is encoded as a 32 bit unsigned integer.

FIG. 15 is an example Multiprotocol Label Switching (MPLS) Forwarding Information Base (FIB) configuration Message 100 according to the techniques of this disclosure. The MPLS FIB Cfg message is generated in cloud computing protocol module of controller 35 (e.g., path computation element 212 of FIG. 19) to download the pre-computed Label Information Base to individual network node (e.g., one of Aggregation nodes 52 or access nodes 62 of FIG. 3A) in the MPLS domain. Upon receiving the message, control plane software on the network node parses the label configuration information, in turn programs the MPLS forwarding table of the network node.

In this example, the MPLS FIB Config message has the structure shown in FIG. 15. A reserved field is for future use. Total Entries field indicates how many MPLS FIB Entry elements are being downloaded in this message. MPLS FIB Entry field 102 is the Forwarding Information for each Label Switched Path (LSP).

FIG. 16 is a block diagram illustrating an example MPLS FIB Entry 102 of MPLS FIB config message 100 (FIG. 15) in further detail, according to one example. Entry 102 has the following structure as shown in FIG. 16. Length field specifies how many bytes is this FIB entry element. OP field specifies one of the following operations to be applied to the FIB:
   ADD—a new FIB element
   CHANGE—modify an existing FIB element
   DELETE—remove an existing FIB element
M field specifies: The Class of Service (CoS) mode for the detour path as one of:
   0—Preserve the CoS bits in original packet
   1—Replace the original CoS bits with a new CoS value specified in "Value" field.
Value field specifies: The new CoS value to be used when the M bit is "1". Incoming Label specifies: MPLS label for an incoming packet. Value of "−1" is considered valid only on Ingress LSR. PATH ID field specifies: A 32-bit identifier for this FIB element. Namespace is managed by controller 35. Primary Port field specifies: Primary path Port Index local to network node.

PA field specifies: MPLS action to be operated on an incoming packet when it takes the detour path. The actions are:
   PUSH—Push the primary label to an incoming packet
   SWAP—Swap the label in an incoming packet with the primary label
   POP—Pop off the top-most label off an incoming packet
Primary Egress Label field specifies: The MPLS Label to be pushed or swapped on to the outgoing packet. Value of "−1" is considered valid only on Egress LSR.

Detour Port field specifies: Port Index local to network node for a detour path is present.

DA1 field specifies: First action to be operated on an incoming packet when it takes the detour path. MPLS actions are:
   PUSH—Push the detour label 1 to an incoming packet label stack
   SWAP—Swap the outmost label in an incoming packet with the detour label 1
   POP—Pop off the top-most label off an incoming packet
Detour Egress Label 1: The MPLS Label value used by the label operations specified in DA1. DA2 field specifies: Second action to be operated on an incoming packet when it takes the detour path. MPLS actions are:
   PUSH—Push the detour egress label 2 to the top of an incoming packet label stack.
   SWAP—Swap the outmost label in an incoming packet with the detour egress label 2.
   POP—Pop off the top-most label off an incoming packet.
Detour Egress Label 2 field specifies: The MPLS Label value used by the label operations specified in DA2. R field: "R" fields are reserved for future use.

FIG. 17 is a block diagram illustrating an example FIB Config Reply Message 104 in accordance with the techniques of this disclosure. The MPLS FIB Config Reply message is for network node to ack back to controller 35 that the MPLS FIB Config message was received and parsed. Status for each incoming label is reported as well.

MPLS FIB Config Reply Message Structure is as follows, as shown in FIG. 17. The total Entries field indicates how many MPLS FIB Parse Status Entry elements are being reported. Value "0" indicates no entry element is being reported, which implies the MPLS FIB Config message was parsed successfully. MPLS FIB Parse Status Entry field 106: each entry reports the status for parsing the MPLS FIB Config entry element. MPLS FIB Parse Status Entry fields 106 may not be present when "Total Entries" has "0" value.

FIG. 18 is a block diagram illustrating an example MPLS FIB Parse Status Entry 106 of FIB Config Reply Message 104 (FIG. 17) in further detail, according to one example. MPLS FIB Parse Status Entry Element has the following structure, as specified in FIG. 18. The Reserved field is currently not used. The PATH ID field specifies the identifier for the MPLS FIB Config entry element. The status field specifies the failure code for this MPLS FIB Entry parsing. Example failure codes include the following:
   0—SUCCESS
   1—Invalid Primary Egress Port
   2—Invalid Primary Label Value
   3—Invalid Primary action
   4—Invalid Detour Egress Port
   5—Invalid Detour Label Value
   6—Invalid Detour action
   7—Invalid Second Detour Egress Port
   8—Invalid Second Detour Label Value
   9—Invalid Second Detour action
   10—Invalid Incoming Label Value The cloud control protocol may include other messages besides those described herein. For example, the cloud control protocol may include a mechanism for a node to signal to a controller that the node is detecting multiple neighbors on a link. Multiple neighbors are not allowed since P2P links are assumed.

Figure 19:
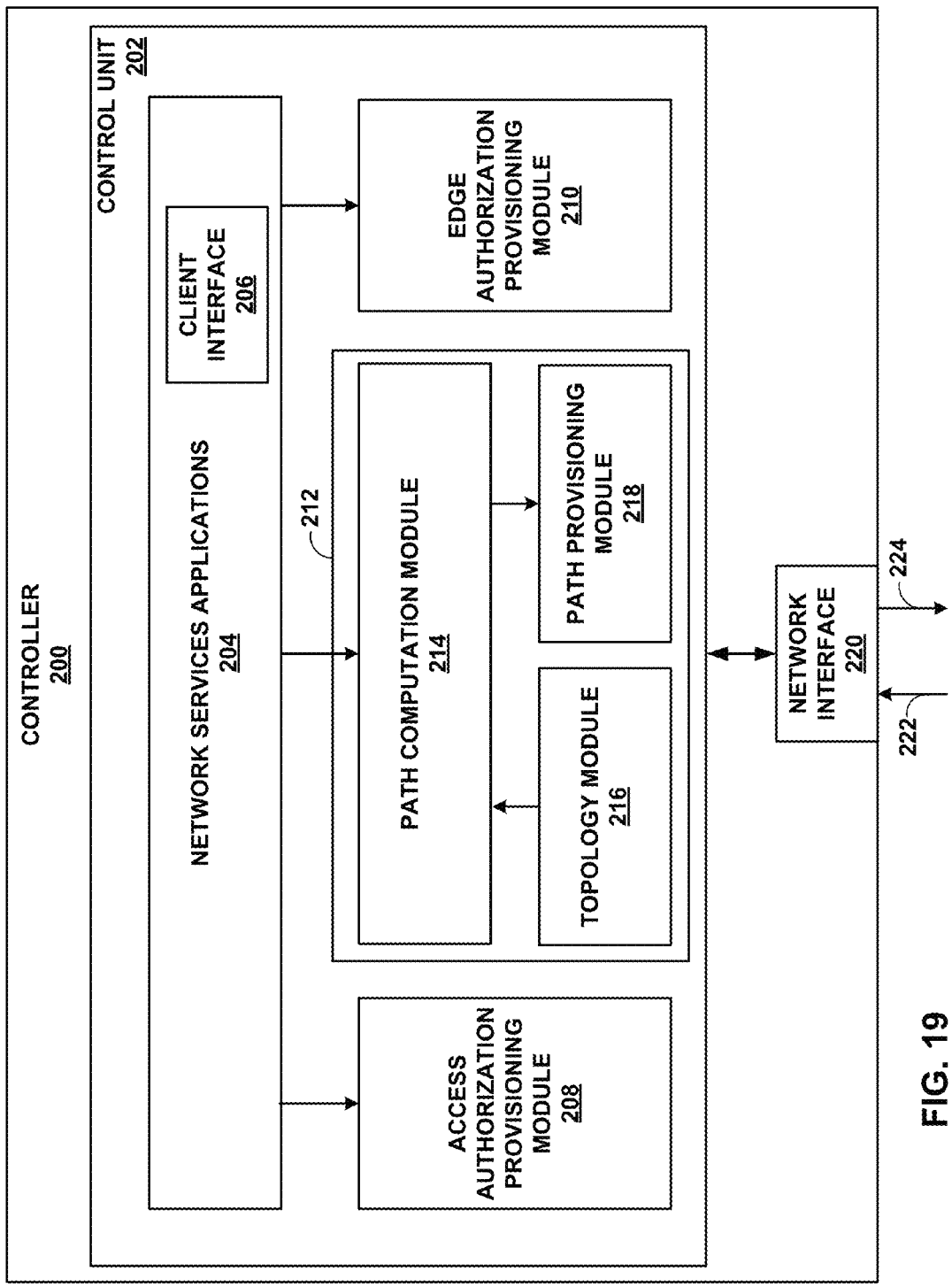
FIG. 19 is a block diagram illustrating an example controller in accordance with this disclosure.

FIG. 19 is a block diagram illustrating an example controller that receives path requests, computes and schedules paths that satisfy the path requests, and establishes requested paths in a path computation domain according to techniques described herein. Controller 200 may include a server or network controller, for example, and may represent an example instance of controller 35 of FIG. 2.

Controller 200 includes a control unit 202 coupled to a network interface 220 to exchange packets with other network devices by inbound link 222 and outbound link 224. Control unit 202 may include one or more processors (not shown in FIG. 19) that execute software instructions, such as those used to define a software or computer program, stored to a computer-readable storage medium (again, not shown in FIG. 19), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively or additionally, control unit 202 may comprise dedicated hardware, such as one or more integrated circuits, one or more Application Specific Integrated Circuits (ASICs), one or more Application Specific Special Processors (AS-SPs), one or more Field Programmable Gate Arrays (FPGAs), or any combination of one or more of the foregoing examples of dedicated hardware, for performing the techniques described herein.

Control unit 202 provides an operating environment for network services applications 204, access authorization provisioning module 208, path computation element 212, and edge authorization provisioning module 210. In one example, these modules may be implemented as one or more processes executing on one or more virtual machines of one or more servers. That is, while generally illustrated and described as executing on a single controller 200, aspects of these modules may be delegated to other computing devices.

Network services applications 204 represent one or more processes that provide services to clients of a service provider network that includes controller 200 to manage connectivity in the aggregation domain (alternatively referred to as the "path computation domain") according to techniques of this disclosure. Network services applications 204 may provide, for instance, include Voice-over-IP (VoIP), Video-on-Demand (VOD), bulk transport, walled/open garden, IP Mobility Subsystem (IMS) and other mobility services, and Internet services to clients of the service provider network. Networks services applications 204 require services provided by path computation element 212, such as node management, session management, and policy enforcement. Each of network services applications 204 may include client interface 206 by which one or more client applications request services. Client interface 206 may represent a command line interface (CLI) or graphical user interface (GUI), for instance. Client 206 may also, or alternatively, provide an application programming interface (API) such as a web service to client applications.

Network services applications 204 issue path requests to path computation element 212 to request paths in a path computation domain controlled by controller 200. In general, a path request includes a required bandwidth or other constraint and two endpoints representing an access node and an edge node that communicate over the path computation domain managed by controller 200. Path requests may further specify time/date during which paths must be operational and CoS parameters (for instance, bandwidth required per class for certain paths).

Path computation element 212 accepts path requests from network services applications 204 to establish paths between the endpoints over the path computation domain. Paths may be requested for different times and dates and with disparate bandwidth requirements. Path computation element 212 reconciling path requests from network services applications 204 to multiplex requested paths onto the path computation domain based on requested path parameters and anticipated network resource availability.

To intelligently compute and establish paths through the path computation domain, path computation element 212 includes topology module 216 to receive topology information describing available resources of the path computation domain, including access, aggregation, and edge nodes, interfaces thereof, and interconnecting communication links.

Path computation module 214 of path computation element 212 computes requested paths through the path computation domain. In general, paths are unidirectional. Upon computing paths, path computation module 214 schedules the paths for provisioning by path provisioning module 218. A computed path includes path information usable by path provisioning module 218 to establish the path in the network. Provisioning a path may require path validation prior to committing the path to provide for packet transport.

Figure 20:
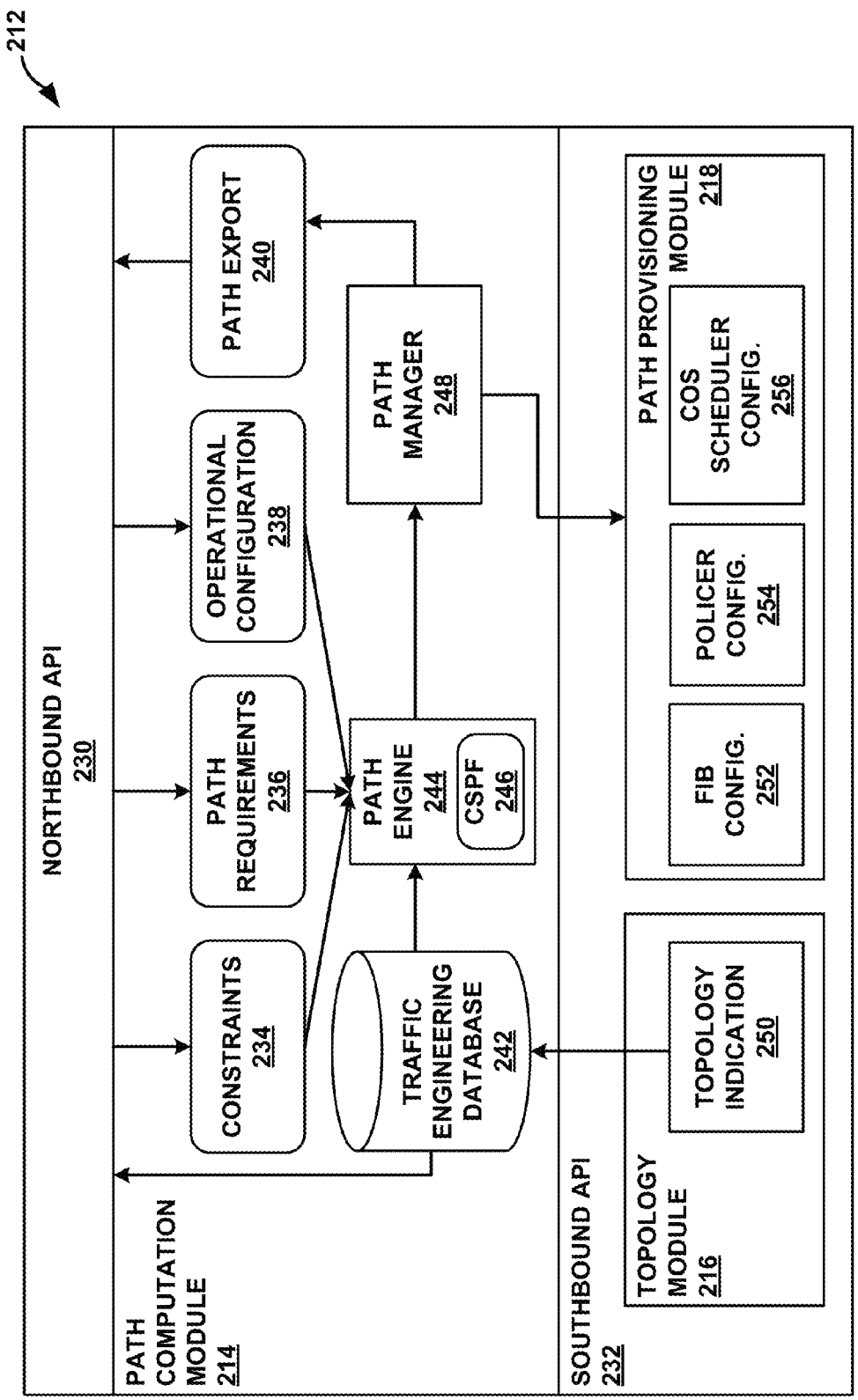
FIG. 20 is a block diagram illustrating, in detail, an example implementation of a path computation element of the centralized controller.

FIG. 20 is a block diagram illustrating, in detail an example implementation of path computation element 212 of controller 200 of FIG. 19. In this example, path computation element 212 includes northbound and southbound interfaces in the form of northbound application programming interface (API) 230 and southbound API (232). Northbound API 230 includes methods and/or accessible data structures by which network services applications 204 may configure and request path computation and query established paths within the path computation domain. Southbound API 232 includes methods and/or accessible data structures by which path computation element 212 receives topology information for the path computation domain and establishes paths by accessing and programming data planes of aggregation nodes and/or access nodes within the path computation domain.

Path computation module 214 includes data structures to store path information for computing and establishing requested paths. These data structures include constraints 234, path requirements 236, operational configuration 238, and path export 240. Network services applications 204 may invoke northbound API 230 to install/query data from these data structures. Constraints 234 represent a data structure that describes external constraints upon path computation. Constraints 234 allow network services applications 204 to, e.g., modify link attributes before path computation module 214 computes a set of paths. For examples, Radio Frequency (RF) modules (not shown) may edit links to indicate that resources are shared between a group and resources must be allocated accordingly. Network services applications 204 may modify attributes of link to effect resulting traffic engineering computations in accordance with CCP. In such instances, link attributes may override attributes received from topology indication module 250 and remain in effect for the duration of the node/attendant port in the topology. A link edit message to constraints 234 may include a link descriptor specifying a node identifier and port index, together with link attributes specifying a bandwidth, expected time to transmit, shared link group, and fate shared group, for instance. The link edit message may be sent by the PCE.

Operational configuration 238 represents a data structure that provides configuration information to path computation element 214 to configure the path computation algorithm with respect to, for example, class of service (CoS) descriptors and detour behaviors. Operational configuration 238 may receive operational configuration information in accordance with CCP. An operational configuration message specifies CoS value, queue depth, queue depth priority, scheduling discipline, over provisioning factors, detour type, path failure mode, and detour path failure mode, for instance. A single CoS profile may be used for the entire path computation domain. These CoS values are described as follows:

Queue Depth: Queue Depth represents the amount of time a packet can sit in a queue before it becomes stale. For TCP traffic, this time is generally the round trip time of the TCP session (150 msec). For VoIP this time is generally 10 to 50 msec. Different nodes may have different buffer capacities. It may not be possible to guarantee a specific time allotment per queue. Nodes should therefore be able to size queues according to the available buffer space and the service class for the queue.

Queue Depth Priority: When a class of service is active over some interface, the interface queues are sized to buffer at the indicated depth based on the bandwidth for the class. If there is insufficient buffer space, queue size is reduced according to queue depth priority. Lower priority classes are reduced before higher priority classes.

Scheduling Discipline: Scheduling Discipline determines how the queue is scheduled with respect to other queues.

and Fail options are available. The PPR option specifies all paths traversing the congested links are reduced proportionally until all paths can be accommodated over the points of congestion. The Ignore option specifies raise an alert message but otherwise allow the network to operate in this oversubscribed manner. The Fail option specifies fail to compute the remainder of the paths and do not admit traffic for failed paths into the network.

Detour Path Failure Mode: Defines the behavior of the system when detour paths cannot be computed due to resource constraints. This attribute may only be applicable when Detour Type is Strict-TE.

Service Class: To make configuration of CoS parameters easier, each CoS can be associated with a specific service class that has default values for each parameter. Example service classes are defined in the following table.

| Service Class | Queue Depth | Queue Depth Priority | Scheduling Discipline | Over Provisioning Factor | Detour Type | Path Failure Mode | Detour Path Failure Mode |
| --- | --- | --- | --- | --- | --- | --- | --- |
| Conversational Voice | 20 msec | High | Strict | 1 | Strict-TE | PPR | PPR |
| Video | 50 msec | Medium | DWRR | 2 | CoS-only | PPR | N/A |
| Assured Forwarding | 150 msec | Medium | DWRR | 10 | CoS-only | PPR | N/A |
| Best Effort | 100 msec | Low | DWRR | 20 | Best-effort | PPR | N/A |

Deficit-weighted round-robin (DWRR) may be used, together with Strict scheduling for voice traffic. Controller 200 configures the schedulers on all node interfaces according to the bandwidth and scheduling class for each CoS active on the interface.

Over-Provisioning Factor: When a path is routed through the network/path computation domain, the path received allocated bandwidth from each link over which the is routed. For some classes of service is it appropriate to over-provision the network. This allows the policers at the edge and access to admit more traffic into the network than the network may actually be able to handle. This might be appropriate in cases where the traffic is best effort, for example. By over-provisioning certain classes of traffic, the network operator may realize better network utilization while still providing required QoS for other classes that are not over-provisioned.

Detour Type: Specifies the traffic engineering requirements for computed detours. Due to resource restrictions, users may elect to configure detours that have fewer constraints than the primary paths. Detour paths may, for instance, take on one of the following values: None, Best-effort, CoS-only, Strict-TE. The None value specifies do not compute detours. The Best-effort value specifies compute detours but ignore TE bandwidth and CoS requirements. CoS is dropped from the packet header and therefore the detour traffic gets best-effort CoS. The CoS-only value specifies preserve CoS but do not traffic engineer the detour. Under these conditions, traffic competes with other primary path traffic equally for available resources, therefore, interface congestion may occur when the detour is active. The Strict-TE value specifies preserve CoS and traffic engineering for the detour.

Path Failure Mode: Defines the per-CoS behavior to take when the primary path computation fails due to resource constraints. The Proportional Path Reduction (PPR), Ignore, The Service Class assigned to a Class of Service may be independent of the node as an attribute of the path computation domain.

Path export 240 represents an interface that stores path descriptors for all paths currently committed or established in the path computation domain. In response to queries received via northbound API 230, path export 240 returns one or more path descriptors. Queries received may request paths between any two edge and access nodes terminating the path(s). Path descriptors may be used by network services applications 204 to set up forwarding configuration at the edge and access nodes terminating the path(s). A path descriptor may include an Explicit Route Object (ERO). A path descriptor or "path information" may be sent, responsive to a query from an interested party, in accordance with CCP. A path export message delivers path information including path type (primary or detour); bandwidth for each CoS value; and, for each node in the ordered path from ingress to egress, a node identifier, ingress label, and egress label.

Path requirements 236 represent an interface that receives path requests for paths to be computed by path computation module 236 and provides these path requests (including path requirements) to path engine 244 for computation. Path requirements 236 may be received in accordance with CCP, or may be handled by the PCE. In such instances, a path requirement message may include a path descriptor having an ingress node identifier and egress node identifier for the nodes terminating the specified path, along with request parameters including CoS value and bandwidth. A path requirement message may add to or delete from existing path requirements for the specified path.

Topology module 216 includes topology indication module 250 to handle topology discovery and, where needed, to maintain control channels between path computation element 212 and nodes of the path computation domain. Topology indication module 250 may include an interface to describe received topologies to path computation module 214.

Topology indication module 250 may use CCP topology discovery or some other topology discovery protocol to describe the path computation domain topology to path computation module 214. Using CCP topology discovery, topology indication module 250 may receive a list of node neighbors, with each neighbor including a node identifier, local port index, and remote port index, as well as a list of link attributes each specifying a port index, bandwidth, expected time to transmit, shared link group, and fate shared group, for instance.

Topology indication module 250 may communicate with a topology server, such as a routing protocol route reflector, to receive topology information for a network layer of the network. Topology indication module 250 may include a routing protocol process that executes a routing protocol to receive routing protocol advertisements, such as Open Shortest Path First (OSPF) or Intermediate System-to-Intermediate System (IS-IS) link state advertisements (LSAs) or Border Gateway Protocol (BGP) UPDATE messages. Topology indication module 250 may in some instances be a passive listener that neither forwards nor originates routing protocol advertisements. In some instances, topology indication module 250 may alternatively, or additionally, execute a topology discovery mechanism such as an interface for an Application-Layer Traffic Optimization (ALTO) service. Topology indication module 250 may therefore receive a digest of topology information collected by a topology server, e.g., an ALTO server, rather than executing a routing protocol to receive routing protocol advertisements directly.

In some examples, topology indication module 250 receives topology information that includes traffic engineering (TE) information. Topology indication module 250 may, for example, execute Intermediate System-to-Intermediate System with TE extensions (IS-IS-TE) or Open Shortest Path First with TE extensions (OSPF-TE) to receive TE information for advertised links. Such TE information includes one or more of the link state, administrative attributes, and metrics such as bandwidth available for use at various LSP priority levels of links connecting routers of the path computation domain. In some instances, indication module 250 executes BGP-TE to receive advertised TE information for inter-autonomous system and other out-of-network links. Additional details regarding executing BGP to receive TE info are found in U.S. patent application Ser. No. 13/110,987, filed May 19, 2011 and entitled "DYNAMICALLY GENERATING APPLICATION-LAYER TRAFFIC OPTIMIZATION PROTOCOL MAPS," which is incorporated herein by reference in its entirety.

Traffic engineering database (TED) 242 stores topology information, received by topology indication module 250, for a network that constitutes a path computation domain for controller 200 to a computer-readable storage medium (not shown). TED 242 may include one or more link-state databases (LSDBs), where link and node data is received in routing protocol advertisements, received from a topology server, and/or discovered by link-layer entities such as an overlay controller and then provided to topology indication module 250. In some instances, an operator may configure traffic engineering or other topology information within MT TED 242 via a client interface.

Path engine 244 accepts the current topology snapshot of the path computation domain in the form of TED 242 and computes, using TED 242, CoS-aware traffic-engineered paths between nodes as indicated by configured node-specific policy (constraints 234) and/or through dynamic networking with external modules via APIs. Path engine 244 may further compute detours for all primary paths on a per-CoS basis according to configured failover and capacity requirements (as specified in operational configuration 238 and path requirements 236, respectively).

In general, to compute a requested path, path engine 244 determines based on TED 242 and all specified constraints whether there exists a path in the layer that satisfies the TE specifications for the requested path for the duration of the requested time. Path engine 244 may use the Djikstra constrained SPF (CSPF) 246 path computation algorithms for identifying satisfactory paths though the path computation domain. If there are no TE constraints, path engine 244 may revert to SPF. If a satisfactory computed path for the requested path exists, path engine 244 provides a path descriptor for the computed path to path manager 248 to establish the path using path provisioning module 218. A path computed by path engine 244 may be referred to as a "computed" path, until such time as path provisioning 218 programs the scheduled path into the network, whereupon the scheduled path becomes an "active" or "committed" path. A scheduled or active path is a temporarily dedicated bandwidth channel for the scheduled time in which the path is, or is to become, operational to transport flows.

Path manager 248 establishes computed scheduled paths using path provisioning module 218, which in this instance includes forwarding information base (FIB) configuration module 252 (illustrated as "FIB CONFIG. 252"), policer configuration module 254 (illustrated as "POLICER CONFIG. 254"), and CoS scheduler configuration module 256 (illustrated as "COS SCHEDULER CONFIG. 256").

FIB configuration module 252 programs forwarding information to data planes of aggregation nodes or access nodes of the path computation domain. The FIB of an aggregation node or access node includes the MPLS switching table, the detour path for each primary LSP, the CoS scheduler per-interface and policers at LSP ingress. FIB configuration module 252 may implement, for instance, a software-defined networking (SDN) protocol such as the OpenFlow protocol to provide and direct the nodes to install forwarding information to their respective data planes. Accordingly, the "FIB" may refer to forwarding tables in the form of, for instance, one or more OpenFlow flow tables each comprising one or more flow table entries that specify handling of matching packets. FIB configuration module 252 may in addition, or alternatively, implement other interface types, such as a Simple Network Management Protocol (SNMP) interface, path computation element protocol (PCEP) interface, a Device Management Interface (DMI), a CLI, Interface to the Routing System (IRS), or any other node configuration interface. FIB configuration module interface 62 establishes communication sessions with aggregation nodes or access nodes to install forwarding information to receive path setup event information, such as confirmation that received forwarding information has been successfully installed or that received forwarding information cannot be installed (indicating FIB configuration failure). Additional details regarding PCEP may be found in J. Medved et al., U.S. patent application Ser. No. 13/324,861, "PATH COMPUTATION ELEMENT COMMUNICATION PROTOCOL (PCEP) EXTENSIONS FOR STATEFUL LABEL SWITCHED PATH MANAGEMENT," filed Dec. 13, 2011, and in "Path Computation Element (PCE) Communication Protocol (PCEP)," Network Working Group, Request for Comment 5440, March 2009, the entire contents of each of which being incorporated by reference herein. Additional details regarding IRS are found in "Interface to the Routing System Framework," Network Working Group, Internet-draft, Jul. 30, 21012, which is incorporated by reference as if fully set forth herein.

FIB configuration module 252 may add, change (i.e., implicit add), or delete forwarding table entries in accordance with information received from path computation module 214 according to CCP. A CCP FIB configuration message from path computation module 214 to FIB configuration module 252 may specify an event type (add or delete); a node identifier; a path identifier; one or more forwarding table entries each including an ingress port index, ingress label, egress port index, and egress label; and a detour path specifying a path identifier and CoS mode.

Policer configuration module 254 may be invoked by path computation module 214 to request a policer be installed on a particular aggregation node or access node for a particular LSP ingress. As noted above, the FIBs for aggregation nodes or access nodes include policers at LSP ingress. Policer configuration module 254 may receive policer configuration requests according to CCP. A CCP policer configuration request message may specify an event type (add, change, or delete); a node identifier; an LSP identifier; and, for each class of service, a list of policer information including CoS value, maximum bandwidth, burst, and drop/remark. FIB configuration module 252 configures the policers in accordance with the policer configuration requests.

CoS scheduler configuration module 256 may be invoked by path computation module 214 to request configuration of CoS scheduler on the aggregation nodes or access nodes. CoS scheduler configuration module 256 may receive the CoS scheduler configuration information in accordance with CCP. A CCP scheduling configuration request message may specify an event type (change); a node identifier; a port identity value (port index); and configuration information specifying bandwidth, queue depth, and scheduling discipline, for instance.

FIG. 21 is a block diagram illustrating an example network device in accordance with this disclosure. Network device 300 may, for example, represent any of aggregation nodes 19 or access nodes 28, 36 of FIG. 1. For example, network device 300 may be an access node that operates at the borders of the network and, responsive to receiving provisioning messages from the controller, applies network services including policy provisioning, policing and network connectivity to the network packets received from the subscriber devices. Network device 300 may reside at a border of an aggregation network, and operate as an endpoint for LSPs to map subscriber traffic into and out of the LSPs.

In the example of FIG. 21, network device 300 includes a control unit 302 that comprises data plane 301 and control plane 303. Data plane 301 includes forwarding component 304. In addition, network device 300 includes a set of interface cards (IFCs) 320A-320N (collectively, "IFCs 320") for communicating packets via inbound links 322A-322N (collectively, "inbound links 322") and outbound links 324A-324N (collectively, "outbound links 324"). Network device 300 may also include a switch fabric (not shown) that couples IFCs 320 and forwarding component 304.

Network device 300 executes a cloud control protocol (CCP) module 306 that operates in accordance with a cloud control protocol, also referred to herein as a discovery protocol. In some examples, cloud control protocol module 306 outputs a discovery message, e.g., a Cloud Control Protocol (CCP) Hello message, on each interface and/or link. Each of the discovery messages includes an identifier that is unique to network device 300 (e.g., an aggregation node or access node) that sent the discovery message and the interface on which the discovery message was sent. In accordance with the discovery protocol, network device 300 also outputs a discovery reply message on each interface on which a discovery message was received. Cloud control protocol module 306 maintains a neighbor node list 310 that identifies neighboring nodes from which network device 300 received discovery messages and the interfaces on which the discovery messages were received.

Responsive to receiving discovery reply messages (e.g., a CCP Hello Reply message) on a link, network device 300 declares the link as an active link and adds the neighboring node to the neighbor node list 310. Cloud control protocol module 306 outputs flood messages that each specify the neighbor node list identifying neighboring nodes and interfaces on which neighboring access nodes and aggregation nodes are reachable from network device 300.

In addition, upon receiving a flood message and determining that the flood message does not include a layer two address for a recipient one of the access nodes and the aggregation nodes, cloud control protocol module 306 updates a stored intermediate node list 312 ("IM node list") of the flood message that specifies layer two addresses and interfaces for the access nodes and the aggregation nodes that the flood message traversed from an originating one of the access nodes and aggregation nodes.

Upon updating the flood message, cloud control protocol module 306 forwards the flood messages to the neighboring nodes that are positioned along paths toward a central controller (e.g., controller 35 of FIG. 1), and the centralized controller, upon receiving the flood messages, establishes a Source Routed Tunnel (SRT) control channel with each of the access nodes and each of the aggregation nodes, including network device 300, based on the intermediate node lists specified by the flood messages. Network device 300 executes the cloud control protocol module 306 without executing an Interior Gateway Protocol (IGP) within a control plane 303 of network device 300.

The centralized controller computes the topology information for the network and computes the forwarding information for the transport label switched paths (LSPs) in accordance with the neighbor node list within each of the flood messages that are received from the network.

Network device 300 receives, from the controller and via the respective SRT control channels, the pre-computed forwarding information computed by the centralized controller for configuring forwarding component 304 of network device 300 to forward the network packets on the LSPs. The pre-computed forwarding information comprises directed FIB state including one or more MPLS labels for network device 300 to use for sending packets on an LSP. In some examples, the directed FIB state includes policers to police ingress traffic for the LSP according to the computed bandwidth. Based on the forwarding information, the centralized controller also computes one or more backup LSPs for the network, and outputs one or more messages to network device 300 to communicate and install, within network device 300, forwarding information for the backup LSPs. Network device 300 stores the forwarding information for the LSPs and the backup LSPs to L-FIB 316 and/or FIB 314. Based on forwarding information base (FIB) 314 and labeled FIB (L-FIB) 316, forwarding component 304 forwards packets received from inbound links 322 to outbound links 324 that correspond to next hops associated with destinations of the packets. In response to a network event, forwarding component 304 may re-route at least a portion of the network packets along the backup LSP. The network event may be, for example, a link or node failure. The controller may also compute detour LSPs to handle fast reroute for any interior node failure.

In one example the centralized controller computes, based on the forwarding information, one or more backup LSPs for the network, and outputs, from the centralized controller, one or more messages to the access nodes and to the aggregation nodes to communicate and install, within the access nodes the aggregation nodes, forwarding information for the backup LSPs. In response to a network event, forwarding components of one or more of the access nodes and the aggregation nodes re-route at least a portion of the network packets along the backup LSP.

In some examples, when forwarding the flood messages network device 300 modifies the flood messages to include one or more link characteristics associated with the interfaces, and the centralized controller computes the forwarding information for the LSPs based at least in part on quality of service (QoS) metrics requested for the LSPs and the link characteristics received from the flood messages.

In some examples, network device 300 sends Keepalive packets to the centralized controller network device to ensure a state of the SRT control channel, and, responsive to determining that no Keepalive Reply is received from centralized controller network device within a time period, network device 300 generates a new Flood message with a new generation number to force acceptance at a centralized controller network device of a new SRT control channel.

In this manner, network device 300 has a reduced control plane 303 that does not execute a Multiprotocol Label Switching (MPLS) protocol for allocation and distribution of labels for the LSPs and does not execute a routing protocol such as an interior gateway protocol (IGP). Instead, network device 300 executes the cloud control protocol module 306 to receive MPLS forwarding information directly from a central controller (e.g., controller 35 of FIG. 1), without requiring conventional MPLS signaling using a label distribution protocol such as LDP or RSVP. The centralized controller network device provides a centralized, cloud-based control plane to configure the plurality of aggregation nodes and access nodes to effectively operate as an MPLS switching fabric to provide transport LSPs between the edge nodes and the access nodes for transport of subscriber traffic. In various examples, the messages exchanged between network device 300 and the centralized controller may conform to any of the message formats described herein.

In one embodiment, forwarding component 304 may comprise one or more dedicated processors, hardware, and/or computer-readable media storing instructions to perform the techniques described herein. The architecture of network device 300 illustrated in FIG. 21 is shown for example purposes only. In other embodiments, network device 300 may be configured in a variety of ways. In one embodiment, for example, control unit 302 and its corresponding functionality may be distributed within IFCs 320.

Control unit 302 may be implemented solely in software, or hardware, or may be implemented as a combination of software, hardware, or firmware. For example, control unit 302 may include one or more processors which execute software instructions. In that case, the various software modules of control unit 302 may comprise executable instructions stored on a computer-readable medium, such as computer memory or hard disk.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various embodiments of the invention have been described. These and other embodiments are within the scope of the following claims.

What is claimed is:

1. A centralized controller in communication with a plurality of aggregation nodes, edge routers, and access nodes of a network, wherein the centralized controller comprises:
   a topology module that executes a software defined networking (SDN) protocol to receive topology information from the edge routers, wherein the topology module receives a plurality of messages flooded by one or more of the access nodes and the aggregation nodes, wherein each respective message of the plurality of messages specifies a respective list of interfaces for the access nodes and the aggregation nodes traversed by the respective message,
   wherein the centralized controller establishes a respective control channel with each of the aggregation nodes based on the lists of interfaces specified by the messages flooded by the aggregation nodes; and
   a path computation module (PCM) that computes forwarding information for one or more transport data channels in accordance with the topology information, wherein the transport data channels are for transporting network packets between the access nodes and the edge routers via the aggregation nodes, wherein the centralized controller outputs one or more messages to the aggregation nodes via the respective control channels to communicate and install within each of the aggregation nodes the forwarding information for configuring forwarding planes of the aggregation nodes to forward the network packets on the one or more transport data channels.

2. The centralized controller of claim 1, wherein the centralized controller outputs one or more messages to the access nodes to communicate and install within each of the access nodes the forwarding information for one or more of the transport data channels for transporting the network packets between the access nodes and the edge routers via the aggregation nodes.

3. The centralized controller of claim 1,
wherein the PCM computes updated topology information for the network based on the list of interfaces specified by the plurality of messages,
wherein the PCM generates the forwarding information for the transport data channels based at least in part on the computed updated topology information.

4. The centralized controller of claim 3, wherein the PCM generates the forwarding information for the transport data channels based at least in part on (i) the computed updated topology information and (ii) one or more of (a) a capacity of links associated with each of the interfaces or (b) path requests for the transport data channels.

5. The centralized controller of claim 1, wherein the centralized controller processes the topology information for the network and computes paths for the transport data channels in real-time based on current load conditions of the network packets at the access nodes and the aggregation nodes.

6. The centralized controller of claim 1, wherein one or more of the plurality of messages flooded by the access nodes and the aggregation nodes includes one or more link characteristics associated with the interfaces, and
wherein the centralized controller generates the forwarding information for the transport data channels at least based on quality of service (QoS) metrics requested for the transport data channels and the link characteristics.

7. The centralized controller of claim 3, wherein the centralized controller establishes a respective control channel with each of the access nodes based on the list of interfaces specified by the messages, and wherein the centralized controller sends to the access nodes, via the respective control channels, the forwarding information generated by the centralized controller for configuring forwarding planes of the access nodes to forward the network packets on the transport data channels.

8. The centralized controller of claim 1, wherein the topology module executes an interior routing protocol to receive at least some of the topology information from the edge routers.

9. The centralized controller of claim 1, wherein the topology module receives at least some of the topology information from a centralized topology database.

10. The centralized controller of claim 1,
wherein, based on the forwarding information, the centralized controller computes one or more backup transport data channels for the network,
wherein the one or more messages communicate and install, within the access nodes and the aggregation nodes, additional forwarding information for the backup transport data channels such that forwarding components of one or more of the access nodes and the aggregation nodes can re-route at least a portion of the network packets along the backup transport data channels in response to a network event.

11. The centralized controller of claim 1, wherein the one or more transport data channels comprise one or more transport label switched paths (LSPs).

12. A method comprising:
executing, by a centralized controller in communication with a plurality of aggregation nodes, edge routers, and access nodes of a network, a software defined networking (SDN) protocol to receive topology information from the edge routers;
receiving, by the centralized controller, a plurality of messages flooded by one or more of the access nodes and the aggregation nodes, wherein each of the respective messages of the plurality of messages specifies a list of interfaces for the access nodes and the aggregation nodes traversed by the respective message;
establishing a respective control channel with each of the aggregation nodes based on the lists of interfaces specified by the messages flooded by the aggregation nodes;
computing, by the centralized controller, forwarding information for one or more transport label switched paths (LSPs) in accordance with the topology information, wherein the transport data channels are for transporting network packets between the access nodes and the edge routers via the aggregation nodes; and
outputting one or more messages from the centralized controller to the aggregation nodes via the respective control channels to communicate and install within each of the aggregation nodes the forwarding information for configuring forwarding planes of the aggregation nodes to forward the network packets on the one or more transport data channels.

13. The method of claim 12, further comprising:
outputting one or more messages to the access nodes to communicate and install within each of the access nodes the forwarding information for one or more of the transport data channels for transporting the network packets between the access nodes and the edge routers via the aggregation nodes.

14. The method of claim 12, further comprising:
computing, by the centralized controller and based on the list of interfaces specified by the plurality of messages, updated topology information for the network; and
generating the forwarding information for the transport data channels based at least in part on the computed updated topology information.

15. The method of claim 14, wherein generating the forwarding information comprises generating the forwarding information for the transport data channels based at least in part on (i) the computed updated topology information and (ii) one or more of (a) a capacity of links associated with each of the interfaces or (b) path requests for the transport data channels.

16. The method of claim 12, further comprising:
by the centralized controller, processing the topology information for the network and computing paths for the transport data channels in real-time based on current load conditions of the network packets at the access nodes and the aggregation nodes.

17. The method of claim 12, wherein one or more of the plurality of messages flooded by the access nodes and the aggregation nodes includes one or more link characteristics associated with the interfaces, the method further comprising:
by the centralized controller, generating the forwarding information for the transport LSPs at least based on quality of service (QoS) metrics requested for the transport data channels and the link characteristics.

18. The method of claim 14, further comprising:
by the centralized controller, establishing a respective control channel with each of the access nodes based on the list of interfaces specified by the messages; and
sending to the access nodes, via the respective control channels, the forwarding information generated by the centralized controller for configuring forwarding planes of the access nodes to forward the network packets on the transport data channels.

19. The method of claim 12, further comprising:
by the centralized controller, executing an interior routing protocol to receive at least some of the topology information from the edge routers.

20. The method of claim 12, further comprising:
by the centralized controller, receiving at least some of the topology information from a centralized topology database.

21. The method of claim 12, further comprising:
computing, by the centralized controller and based on the forwarding information, one or more backup transport data channels for the network; and
wherein outputting the one or more messages to the access nodes and to the aggregation nodes comprises outputting the one or more messages to communicate and install, within the access nodes and the aggregation nodes, additional forwarding information for the backup transport data channels such that forwarding components of one or more of the access nodes and the aggregation nodes can re-route at least a portion of the network packets along the backup transport data channels in response to a network event.

22. The method of claim 12, wherein the one or more transport data channels comprise one or more transport label switched paths (LSPs).

* * * * *